(12) United States Patent
Meyer

(10) Patent No.: US 10,252,348 B2
(45) Date of Patent: Apr. 9, 2019

(54) COMPENSATING CHUCK

(71) Applicant: Volker Henke, Oyten (DE)

(72) Inventor: Jens Meyer, Oyten (DE)

(73) Assignee: HVM Technology GmbH, Oyten (DE)

( * ) Notice: Subject to any disclaimer, the term of this patent is extended or adjusted under 35 U.S.C. 154(b) by 0 days.

(21) Appl. No.: 14/360,111

(22) PCT Filed: Nov. 14, 2013

(86) PCT No.: PCT/EP2013/073875
§ 371 (c)(1),
(2) Date: May 22, 2014

(87) PCT Pub. No.: WO2014/114380
PCT Pub. Date: Jul. 31, 2014

(65) Prior Publication Data
US 2015/0352642 A1    Dec. 10, 2015

(30) Foreign Application Priority Data

Jan. 25, 2013   (DE) .................. 10 2013 201 231

(51) Int. Cl.
*B23B 31/16*   (2006.01)
*B23B 31/177*   (2006.01)

(52) U.S. Cl.
CPC ........ *B23B 31/16254* (2013.01); *B23B 31/16* (2013.01); *B23B 31/16233* (2013.01);
(Continued)

(58) Field of Classification Search
CPC . B23B 31/16; B23B 2231/22; B23B 2231/30; B23B 31/1654; Y10T 79/1291; Y10T 279/1973; Y10T 279/17675
See application file for complete search history.

(56) References Cited

U.S. PATENT DOCUMENTS 1,713,803 A    5/1929   Whiton
1,727,535 A    9/1929   Conradson
(Continued)

FOREIGN PATENT DOCUMENTS

CH    678823 A5    11/1991
CN    2124095      12/1992
(Continued)

OTHER PUBLICATIONS

European Patent Office, Search Report issued in International application No. PCT/EP2013/073875 dated Feb. 7, 2014.
(Continued)

*Primary Examiner* — Daniel Howell
*Assistant Examiner* — Paul M Janeski
(74) *Attorney, Agent, or Firm* — Wood Herron & Evans LLP

(57) ABSTRACT

A compensating chuck for concentrically clamping workpieces. The chuck has a drive unit having two pairs of entrainment members, wherein the entrainment members are preferably slidingly mounted, are respectively movable in paired relationship, and are so coupled to a respective one of the main jaws that a relative movement of a respective pair causes a synchronous movement of adjacent main jaws and that both a relative movement relative to each other with respectively different movement components and also a synchronous movement of the adjacent entrainment members in the same direction respectively causes a relative movement of adjacent main jaws.

25 Claims, 32 Drawing Sheets

(52) U.S. Cl.
CPC ....... *B23B 2231/22* (2013.01); *B23B 2231/30* (2013.01); *Y10T 279/1291* (2015.01); *Y10T 279/17675* (2015.01); *Y10T 279/1973* (2015.01)

(56) References Cited

U.S. PATENT DOCUMENTS

| | | | |
|---|---|---|---|
| 3,082,015 A * | 3/1963 | Hohwart | B23B 31/18 |
| | | | 279/106 |
| 3,698,729 A | 10/1972 | Scharfen et al. | |
| 4,938,491 A * | 7/1990 | Sumenko | B23B 31/16045 |
| | | | 279/121 |
| 9,156,092 B2 * | 10/2015 | Karlein | B23B 31/16 |
| 2003/0222415 A1 * | 12/2003 | Mandokoro | B23B 31/16 |
| | | | 279/118 |
| 2008/0157487 A1 * | 7/2008 | Hall | B23B 31/101 |
| | | | 279/4.12 |

FOREIGN PATENT DOCUMENTS

| | | |
|---|---|---|
| CN | 101015864 | 8/2007 |
| CN | 201900283 U | 7/2011 |
| DE | 1066071 B | 12/1954 |
| DE | 4016527 A1 | 12/1990 |
| DE | 102004001839 A1 | 8/2005 |
| JP | 1971001593 A | 9/1971 |
| JP | 60-117010 U1 | 8/1985 |
| JP | 61-193930 U1 | 12/1986 |
| JP | 62-58135 U1 | 4/1987 |
| JP | H04115547 A | 4/1992 |
| WO | 9836862 A1 | 8/1998 |
| WO | 2011137884 A1 | 11/2011 |

OTHER PUBLICATIONS

European Patent Office, Written Opinion issued in International application No. PCT/EP2013/073875 dated Feb. 11, 2014
Chinese Patent Office, Office Action issued in Chinese Application No. 201380037931.2 dated Jan. 4, 2016 and English Language Translation (14 pages).
Korean Patent Office, Office Action issued in Korean Application No. 10-2015-7010561 dated Jun. 10, 2016 and English Language Translation (14 pages).

* cited by examiner

COMPENSATING CHUCK

BACKGROUND

The present invention concerns a compensating chuck for concentrically clamping workpieces, comprising a housing, two pairs of mutually diametrically opposed main jaws for receiving corresponding clamping jaws, and a transmission for preferably radially moving the main jaws towards and away from each other.

Chucks of the above-indicated kind are also referred to as four-jaw chucks or four-jaw clamping chucks. Chucks for concentric clamping are basically required whenever workpieces have to be gripped in machine tools or for machining, which in particular are machined in a rotational mode. In modern manufacturing environments, there is an increasing need for clamping devices which can be used both for turning and also for milling. Accordingly, the invention concerns a chuck for such purposes of use. The reason for in any way considering the use of four jaw chucks in comparison with three jaw chucks is that, with a larger number of jaws which embrace the workpiece, the spot loading on each individual jaw is reduced. Consequently, with a larger number of jaws, the forces which act on the workpiece and which consequently deform the workpiece are more uniformly distributed over the periphery of the workpiece. That increases the dimensional accuracy of the workpiece after machining.

Four jaw chucks are known from the state of the art, which provide for concentric clamping. In general, however, they suffer from the disadvantage that they are only suitable for gripping round workpieces or they have to be of a mirror-image symmetrical configuration in both jaw planes so that all four jaws can engage the workpiece when gripping it. Such rigidly concentrically gripping jaws, by virtue of a lack of compensation in regard to workpiece geometry, enjoy only limited practical utility in relation to 'non-round' workpieces.

Four jaw compensating chucks are also known from the state of the art, which however also suffer from crucial disadvantages. In many four jaw chucks with a compensating function, the reproduction accuracy in terms of concentric workpiece gripping is limited.

WO 2011/137884 A1 discloses for example a four jaw chuck having a compensating function, such that adjacent jaws of the chuck are coupled together by way of one or more oscillating rods. When, when dealing with a workpiece which is not rotationally symmetrical, a first pair of jaws is first brought into contact with the workpiece while the other pair of jaws is not yet in contact therewith, the corresponding rods are deflected and the second pair of jaws is successively moved towards the workpiece. That kinematic structure suffers from the disadvantage that, by virtue of the lever lengths which necessarily have to be tolerated as between the drive force and the jaw, there is a certain elasticity in the system and drive force losses occur. The high level of complexity of the components involved also makes the systems potentially susceptible to fault.

A further approach for compensation in regard to four jaw chucks is to be found in the area of chucks actuable by means of power clamping. DE 10 2004 001 839 A1 discloses a four-jaw chuck in which the four jaws are pulled along conical sliding surfaces by means of a clamping cylinder. Hydraulically or mechanically implemented force directional conversion results in displacement of conical compensating elements in opposite relationship to the clamping direction, which are intended to permit jaws which are not yet in contact to approach the workpiece. This system is considered to have, in particular, the advantage that the maximum possible compensation travel is extremely short and the structural height of the clamping device overall is unacceptably high for certain purposes of use. In addition the system is again suitable for a hand clamping mode of operation.

With that background in mind, an object of the present invention is to provide a chuck which, as far as possible, alleviates the above-indicated disadvantages. In particular, the object of the invention was to provide a compensating chuck which ensures reliable centering and at the same time affords a compensation range which is as large as possible.

SUMMARY

In a compensating chuck of the kind set forth above, the invention attains its object in that the transmission has a drive unit having two pairs of drivable entrainment members. The entrainment members are mounted movably, preferably slidingly, particularly preferably without play, in the housing. The entrainment members are respectively movable towards and away from each other in paired relationship. The entrainment members are so coupled to a respective one of the main jaws that a relative movement of the entrainment members of a respective pair with the same movement components relative to each other causes a synchronous movement of adjacent main jaws, and that both a relative movement of the entrainment members relative to each other with respectively different movement components and also a synchronous movement of the adjacent entrainment members in the same direction respectively causes a relative movement of adjacent main jaws relative to each other. The term synchronous movement is used in relation to the main jaws to mean that they move towards or away from each other at the same time and equally fast jointly, preferably radially.

In a first aspect of the invention, an embodiment thereof provides that those entrainment members which are respectively associated with diametrically opposite main jaws are respectively rigid relative to each other. In that respect, the embodiment of the invention makes use of the realization that rigid coupling of a respective pair of entrainment members to each other in combination with the relative mobility of the pairs of entrainment members in relation to each other provides that by the drive of the drive unit, both pairs can be moved relative to each other, whereby, with simultaneous movement of both pairs of entrainment members relative to each other (with identical movement components), all four main jaws are moved uniformly radially towards or away from each other. In addition, the mobility of the drive unit within the housing permits a compensating movement, that is to say a relative movement of the main jaws relative to each other, if a workpiece which is not completely rotationally symmetrical is inserted into the chuck. The advantage of the invention and the mode of operation according to the invention will be clearly apparent from the following two use situations. Because the entrainment members are coupled to a respective one of the main jaws in such a way that a relative movement of both pairs of entrainment members relative to each other, that is to say a movement of both pairs of entrainment members at the same time, causes a uniform movement of adjacent main jaws, a concentric clamping movement of all main jaws occurs as long as none of the main jaws is impeded in its movement. If, however, the first of the two pairs of main jaws is in contact with the workpiece, it is impeded in its movement.

A further relative movement of the pairs of entrainment members is, however, not hindered thereby; because of the above-mentioned coupling, until the hindrance to movement occurs, the clamping jaws or main jaws are moved concentrically towards each other. More precisely, diametrically opposite main jaws always move concentrically towards each other. If therefore, for example by virtue of reaching the workpiece, a first pair of main jaws is impeded, the workpiece is already centered in that plane. The further movement of the second pair of main jaws is made possible by virtue of the fact that the pairs of entrainment members can deflect in the housing movably, preferably slidingly, particularly preferably without play. While, therefore, one of the pairs of entrainment members remains stationary by virtue of the clamping position being reached, the second pair of entrainment members further moves relative to the first pair thereof, in which case the drive unit is also moved to compensate for and ensure concentricity.

With a pure synchronous (sliding) movement of the entrainment members in the same direction without simultaneous relative movement of the entrainment members relative to each other, a pair of main jaws is always moved symmetrically relative to the center, that is to say concentrically, inwardly, while the other is moved outwardly symmetrically relative to the center. A very high level of reproduction accuracy in regard to concentricity of the clamping effect is achieved by the provision according to the invention of the drive unit and suitable coupling of the entrainment members to the main jaws. The amplitude of the maximum compensation of the main jaws relative to each other is decisive, in regard to the magnitude of the motional play of the pairs of entrainment members in the housing. It can thus be varied within wide limits.

An advantageous embodiment of the invention provides that the transmission has a sliding guide transmission coupled to the drive unit. The term sliding guide transmission is used in this respect to denote a plurality of transmission members which are connected together for the transmission of drive forces and of which one, more or all transmission members are respectively movable in guided relationship in a sliding guide. Particularly preferably in accordance with the invention in the first aspect, there is provided a sliding guide transmission having transmission members which are movable exclusively with a translatory movement, being in particular linearly sliding. The advantage arising out of the provision of such a sliding guide transmission is that the transmission can be effected very directly and with a very high level of system stiffness, by way of a sliding guide transmission. In addition, a sliding guide and corresponding transmission members slidable in the sliding guides can be produced with comparatively simple manufacturing means, for example milling, while it is possible nonetheless to ensure a high level of production precision.

In a preferred embodiment of the invention, the entrainment members are movable in a first horizontal plane parallel to a first axis and the main jaws are movable in a main jaw plane parallel to the first plane. The advantage of orienting both the driving entrainment members and the main jaws in horizontal planes in mutually parallel relationship is that it is possible to achieve a very small structural height in comparison with compensating chucks in the state of the art.

Preferably, the above-identified entrainment members are first entrainment members and the compensating chuck has a set of second entrainment members which are mounted slidingly, preferably without play, in the housing. Preferably, a respective one of the second entrainment members is in engagement with one of the first entrainment members on the one hand and with one of the main jaws on the other hand in such a way that the movement of the first entrainment members is converted into the movement of the main jaws by means of the second entrainment members. Particularly preferably, the second entrainment members are movable in a second horizontal plane parallel to a second axis. That second plane is preferably arranged between the first plane and the plane of the main jaws. The second axis is preferably oriented substantially at a right angle to the first axis and, further preferably, displaced by the spacing of the second plane relative to the first plane from the first axis.

With a linear movement of the first entrainment members, in most transmission configurations, a second direction-changing movement is necessary in order to convert the drive force acting in the direction of the first entrainment members to the radial mobility of the main jaws. By that being effected in accordance with the proposed embodiment by a second set of entrainment members in a plane which is also horizontal, the advantage of a small structural height with the solution according to the invention is further emphasized.

In a preferred embodiment, the main jaws respectively have a sliding guide, in particular on the side remote from the coupling portion for the clamping jaws, in which a corresponding projection of one of the second entrainment members is guided preferably without play.

In a further preferred embodiment, the second entrainment members respectively have a sliding guide in which a corresponding projection of one of the first entrainment members is guided in particular without play.

Preferably, the sliding guides are formed on the first entrainment members, on a side in opposite relationship to the projections of the second entrainment members.

In a further preferred embodiment of the invention, the drive unit has a drive spindle and two slides in engagement with the drive spindle by means of a corresponding thread. A spindle can be produced economically in terms of manufacture and is drivable mechanically or by motor means, using simple mechanical means. Accordingly, the principle according to the invention is suitable both for a hand clamping mode of operation and also for power-assisted clamping.

Preferably, the drive spindle and the first slide have a first thread pitch in the region of their engagement and wherein the drive spindle and the second slide have in the region of their engagement a second thread pitch which is different from the first thread pitch and which is preferably in opposite relationship to the first thread pitch. Because the threads are respectively oriented in opposite relationship, that is to say for example the first thread has a left-hand pitch while the second thread has a right-hand pitch, or vice-versa, the two slides move relative to each other and towards each other in the case of an impediment-free clamping movement, while the mass center of gravity of the drive unit overall remains stationary. As long as the mass center of gravity of the mass unit does not move, it is assumed in accordance with the invention that the drive unit overall is not moved even though the individual slides and entrainment members of the drive unit can move relative to each other.

Preferably, a first pair of the first entrainment members is arranged fixedly on the first slide of the drive unit and a second pair of the first entrainment members is arranged fixedly on the second slide of the drive unit.

Preferably, the pairs of the first entrainment members are respectively associated with diametrically opposite main jaws. Further preferably, the pairs of the first entrainment members are arranged in mutually cross-wise opposite relationship with respect to the drive spindle.

In a further preferred embodiment of the invention, the drive spindle and the direction of movement of the (first) entrainment members are oriented parallel to each other.

In a further preferred embodiment, the (first) entrainment members are mounted movably, preferably slidingly, particularly preferably without play, in the housing, preferably by means of guide means provided on the entrainment members. Because the guide means for the first entrainment members can also be used for guiding the drive unit, it is possible to dispense with guide means in respect of the drive unit and in particular the multi-part drive slide and the drive spindle. That further simplifies the structural configuration of the arrangement.

In a second aspect, an embodiment of the invention provides that those entrainment members which are respectively associated with diametrically opposite main jaws are respectively movable in opposite directions synchronously relative to each other. While in the compensating chuck in accordance with the first aspect described hereinbefore a respective pair of mutually diagonally opposite entrainment members are arranged rigidly relative to each other (which has the consequence that respectively adjacently arranged entrainment members of a pair which are movable towards and away from each other are moved towards each other while the respective other adjacent entrainment members are moved away from each other), in this second embodiment both pairs of entrainment members are moved towards each other when the drive unit drives. The respectively diametrically opposite entrainment members are also synchronously moved as a result. The invention in accordance with the second aspect, however, has substantially the same advantages as the invention in accordance with the first aspect, for which reason attention is directed in that respect to the foregoing description.

Preferably in accordance with the second aspect, the mutually diametrically opposite entrainment members are respectively coupled together by means of a coupling member which is preferably pivotable about a vertical axis. While with the compensating chuck according to the first aspect it is possible to dispense with the coupling member in the form of a pivotable element, such an element is provided in accordance with the second aspect. The slight loss of system stiffness which is potentially to be accepted as a result of that is however compensated by the fact that a completely symmetrical movement of the four entrainment members relative to each other is achieved by means of the change in direction. That provides that the transmission of the drive unit is overall of a structurally simpler configuration. In addition, the concentricity upon clamping is still further improved. Preferably, a respective one of the entrainment members is in engagement with one of the main jaws in such a way that the movement of the entrainment members is directly converted into the movement of the main jaws. The advantage of pivotable coupling of the diametrically opposite entrainment members is particularly clear in this embodiment; it is possible to dispense with a second entrainment member plane. As a result, the transmission of the drive unit has fewer moving parts.

Preferably, the main jaws respectively have a sliding guide in which a corresponding projection of one of the entrainment members is guided, preferably without play. In that respect, this embodiment in accordance with the second aspect is also similar to the embodiment of the first aspect of the invention, with the difference that it is not the second entrainment members that engage into the sliding guide of the main jaws, but the (first) entrainment members of the compensating chuck that are directly in engagement there.

In a further preferred embodiment, the drive unit for each entrainment member has a separate slide and each of the entrainment members is arranged fixedly on the respective slide. That also distinguishes the embodiment of the second aspect of the invention from that of the first aspect. In accordance with the second aspect, there are no longer two entrainment members respectively fixedly coupled together at a slider, but all four entrainment members are arranged on separate sliders. The third and fourth sliders are moved synchronously relative to the respective first and second sliders, by way of the coupling of the diametrically opposite entrainment members by means of the coupling members. In regard to mounting and support in respect of the third and fourth sliders, preferably the same technical implementation applies as for the first and second sliders in the embodiment in accordance with the first aspect of the invention.

In a third aspect of the invention, the compensating chuck is further developed in respect of its kind of drive. In regard to a large number of common aspects with the first and second aspects of the invention, attention is directed to the preferred embodiments described hereinbefore, which can also be seen from the following Figures.

The compensating chuck which is further developed in accordance with this aspect also has a drive unit having a drive piston adapted for connection to a power clamping unit of a machine tool. The drive piston is also referred to as the stroke piston or chuck piston. Preferably, the drive piston is adapted to receive a coupling element which can be connected to the pulling tube of the power clamping unit of the machine tool. That can be, for example, a pulling screw whose screw head is received in the interior of the drive piston in an opening therein and is supported against a shoulder in such a way that pulling forces can be transmitted from the power clamping unit to the drive piston in the direction of a stroke axis X. The large number of different machine tools available on the market have in part mutually differing pulling tubes or pulling rods. Therefore, to connect the compensating chuck according to the invention, it can alternatively or additionally be provided that there is a pulling tube adaptor to be connected to the drive piston, which engages the drive piston for transmission of the clamping forces from the power clamping unit, and can be connected to the pulling rod or pulling tube of the power clamping unit for transmission of the drive forces.

In a preferred embodiment of the invention, the drive piston which is movable in the direction of the stroke axis H is received in the compensating chuck preferably in guided relationship in such a way that a movement outside the direction in the stroke axis H is prevented as much as possible. That contributes to freedom of play or a small amount of play in respect of the chuck. In addition, the drive unit preferably has a first and a second sliding portion which are respectively movable at an angle, preferably perpendicularly, to the stroke axis H, preferably being guided in corresponding openings in the drive piston. The sliding portions can be of a carriage-like configuration and can be received in guided sliding relationship in corresponding grooves.

Preferably, the sliding portions are coupled to the entrainment members in such a way that a movement of the drive piston in the direction of the stroke axis H leads to a movement of two diametrically opposite entrainment members (with respect to the stroke axis) or an entrainment member.

In an advantageous embodiment, the sliding portions respectively have projections which are coupled in sliding guide relationship with the entrainment members in such a way that a movement of the respective sliding portion in the direction of the stroke axis H causes a relative movement of the entrainment members coupled to the sliding portion perpendicularly to the stroke axis H. That kind of sliding guide which is already implemented by the interplay of a plurality of entrainment members with each other (in the first aspect) or of the entrainment members with the main jaws (first and second aspect), also contributes to play-free movement of the entrainment members in the compensating chuck in accordance with the third aspect of the invention.

In a further preferred embodiment, the sliding portions are arranged in mutually (diametrically) opposite relationship with respect to the stroke axis H, are connected by means of one or more coupling members and are movable synchronously relative to each other in opposite directions. The coupling effect and oppositely synchronous mobility of the sliding portions has substantially the following effect: upon movement of the drive piston in the direction of the stroke axis H firstly the entrainment members are moved synchronously towards or away from each other as a consequence of the slide-like guide means and the projections, engaging therein, of the sliding portions. If two mutually diametrically opposite entrainment members are blocked, for example by bearing against a workpiece to be clamped, then as the drive movement of the drive piston is continued in the direction of the stroke axis H the sliding portions move laterally relative to the drive piston, by virtue of their guide means. By virtue of their coupling together, a movement of the first sliding portion in one direction results in a synchronous movement of the second sliding portion in the opposite direction, preferably at the same speed. That, in turn, leads to the two non-blocked, mutually diametrically opposite entrainment members being further moved in spite of blocking of the other pair of entrainment members, and this implements complete clamping and central gripping of the workpiece. The quantitative magnitude of the maximum compensation travel or the maximum travel difference between the entrainment members and thus also between the main jaws of the compensating chuck, in the compensating chuck in accordance with this aspect, depends crucially on the length of the compensating travel or the extent of the relative mobility of the sliding portions with respect to each other. That is, in turn, determined in particular by the nature and length of the coupling members connecting the sliding portions.

BRIEF DESCRIPTION OF THE SEVERAL VIEWS OF THE DRAWINGS

The invention is described in greater detail hereinafter by means of preferred embodiments by way of example and with reference to the accompanying Figures.

FIGS. 12a-d show various views of the compensating chuck as shown in the foregoing Figures in a third operating condition.

DETAILED DESCRIPTION

Figure 1:
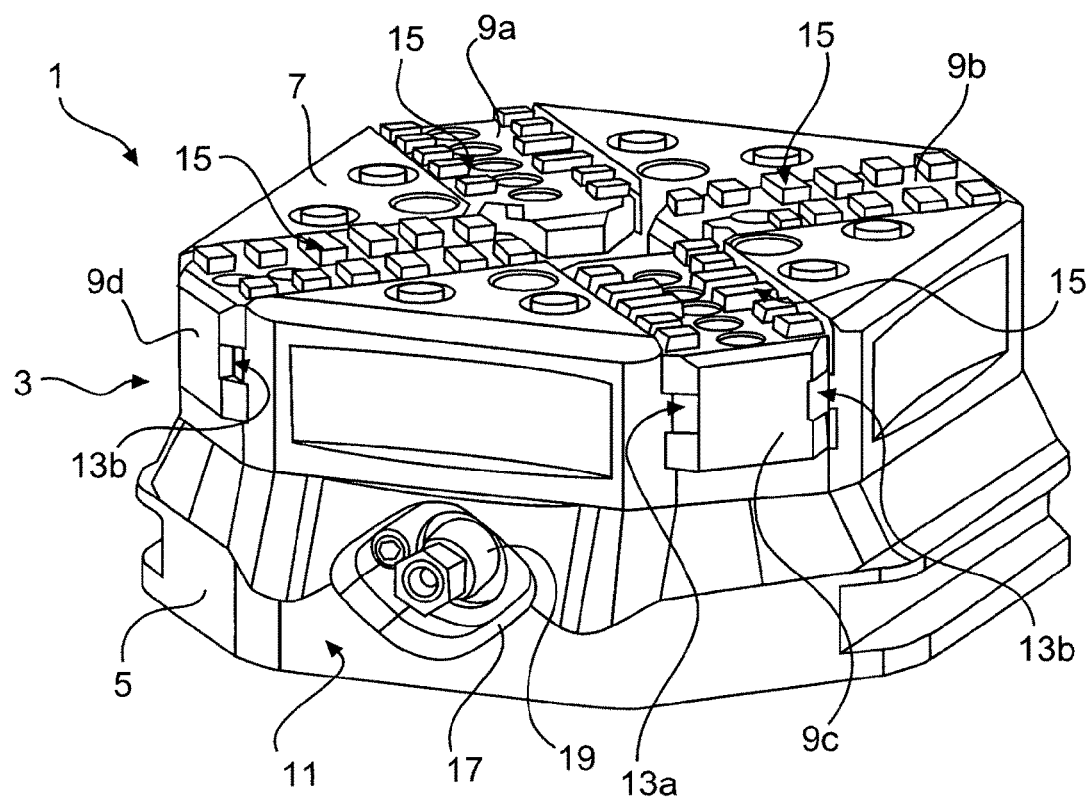
FIG. 1 shows an overall view of a compensating chuck according to the preferred embodiment of the invention.

FIG. 1 shows a compensating chuck 1 according to a first preferred embodiment of the invention. The compensating chuck 1 has a housing 3. The housing 3 is subdivided into a lower housing part 5 and an upper housing part 7. The lower housing part 5 is functionally adapted to receive a drive unit 11. The upper housing part 7 is functionally adapted to receive a plurality of main jaws 9. In the complete assembly condition shown in FIG. 1, a total of four main jaws 9, in mutually opposite relationship in pairs, are disposed concentrically relative to each other and are fitted into suitable openings in the housing part 7. The main jaws 9 are guided linearly slidingly, preferably without play, in the upper housing part 7 of the housing 3. Respective parallel guide rails and suitable corresponding projections 13a, b serve for guidance purposes. On their outside surface directed upwardly in FIG. 1, the main jaws respectively have coupling means 15 for connection to clamping jaws of a corresponding configuration.

The lower housing part 5 of the housing 3 accommodates the drive unit 11. A lateral opening 17 in the housing 3 is adapted to enable access to a drive spindle 19 extending outwardly through the opening 17. The assembled condition of the compensating chuck shown in FIG. 1 differs from the condition shown in FIG. 2 in that, in the FIG. 2 view, only the lower part 5 of the housing 3 together with the drive unit 11 is shown.

In its interior, the housing 3 has a receiving means 21 in which the drive unit 11 is mounted slidingly, in particular without play. The drive unit 11 is reciprocatable between a first abutment surface 23, preferably distally with respect to the opening 17, and a second abutment surface 25, preferably proximally relative to the opening 17. Details in regard to the drive unit will be discussed more fully hereinafter with reference to FIGS. 4 and 5.

Figure 2:
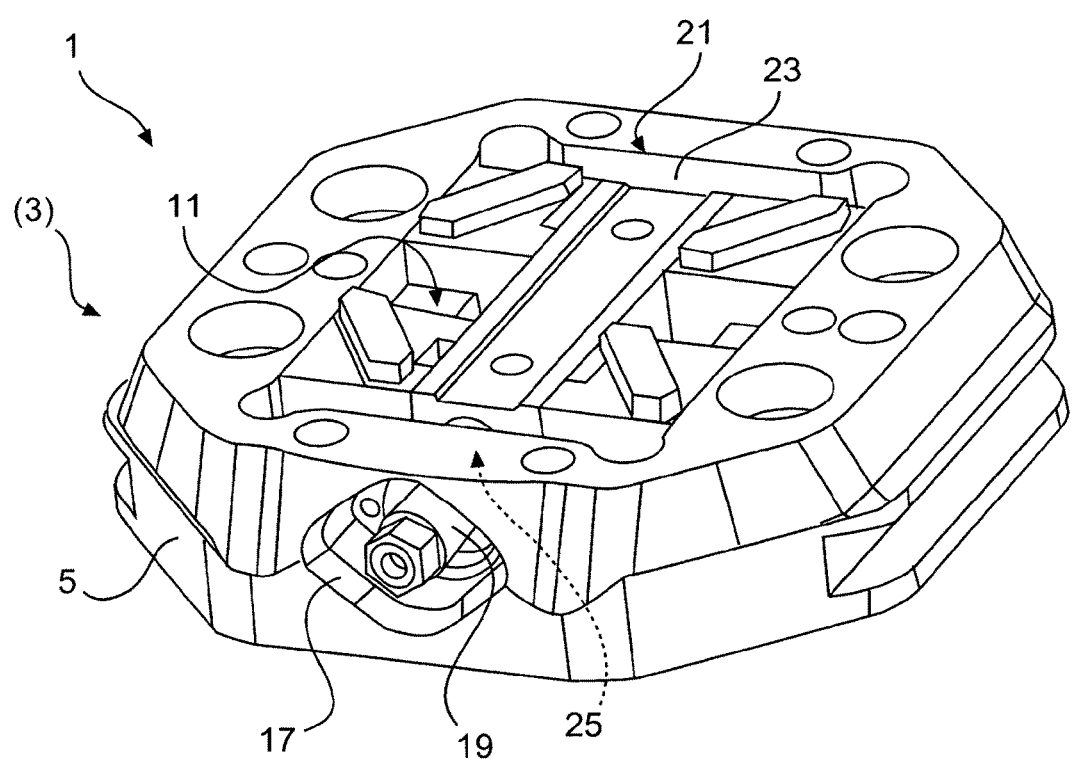
FIG. 2 shows a perspective view of the compensating chuck of FIG. 1 in a partly assembled condition.
Figure 3:
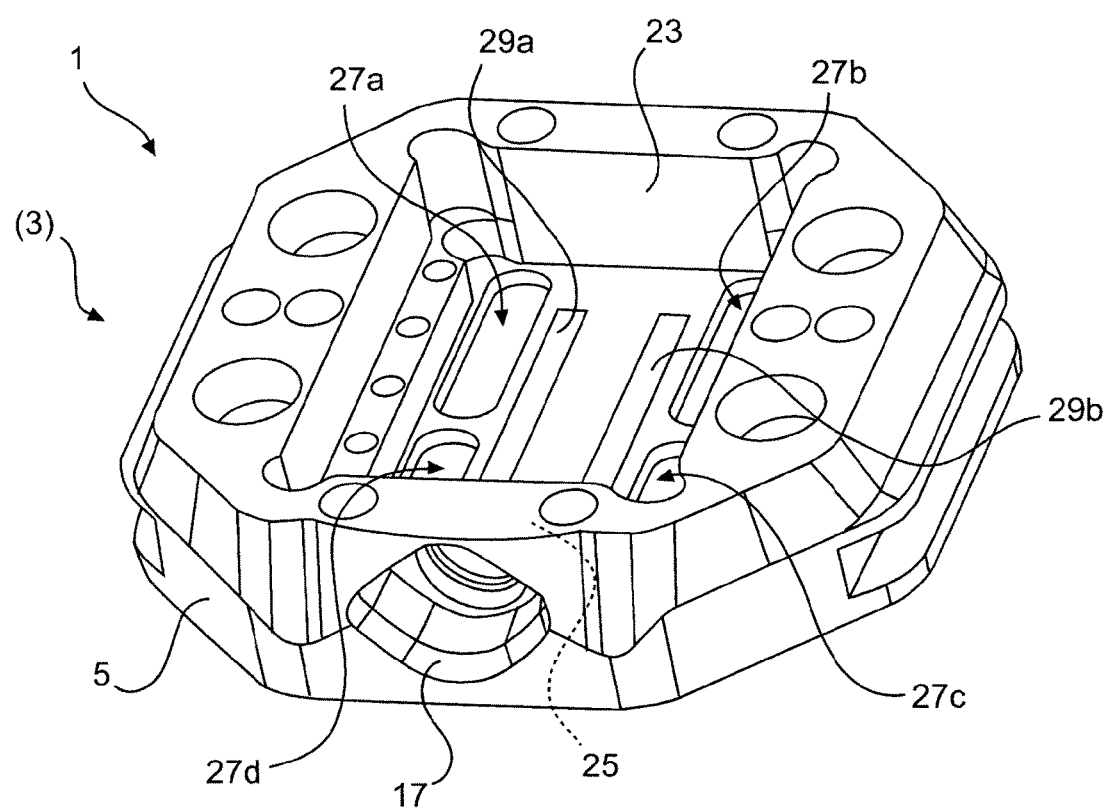
FIG. 3 shows a perspective view of the compensating chuck of FIGS. 1 and 2 in a further partly assembled condition.

In the partial view in FIG. 3, the drive unit 11 which in FIG. 2 is still shown within the lower part 5 of the housing 3 is removed. This therefore gives a clear view on to a plurality of openings 27a-d for guiding the drive unit 11 in the direction of its displaceability between the abutment surfaces 23, 25. Two sliding rails 29a, b are provided between the mutually opposite openings 27a, d; 27b, c. The sliding rails 29a, b are adapted to provide the lowest possible coefficient of friction between the drive unit 11 and the housing 3 so that it is possible to achieve a displacement movement involving the lowest possible level of force.

Figure 4:
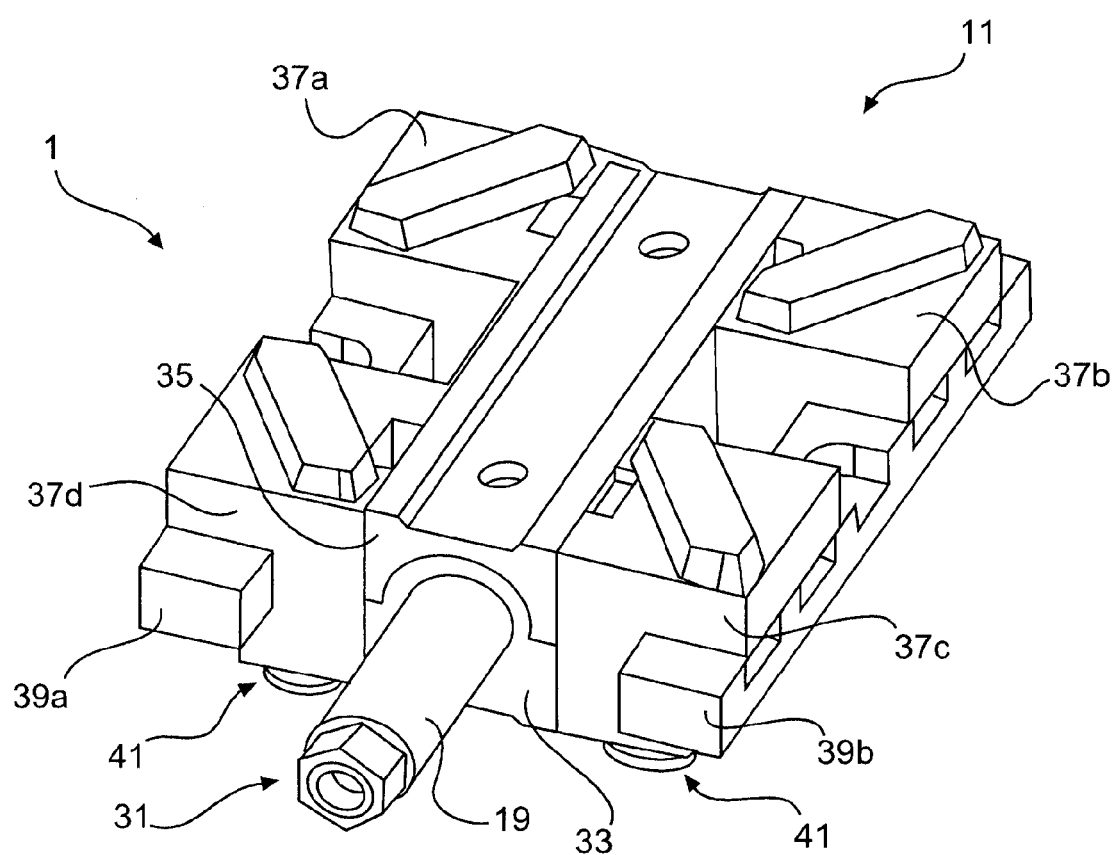
FIG. 4 shows a perspective view of the compensating chuck of FIGS. 1 through 3 in a further partly assembled condition.

FIG. 4 shows the drive unit 11 in detail. The drive unit 11 has a head portion 31 at the end of the drive spindle 19, that in the assembled condition is extended through the opening 17 in the housing 3. The head portion 31 is adapted to come into engagement with a tool wrench.

In a first region, the drive spindle 19 is connected in force-transmitting relationship to a first slide 33 by means of a first thread portion, while in a second region it is connected in force-transmitting relationship to a second slide 35 by a second thread portion. The first slide 33 and the second slide 35 are moved relative to each other by virtue of opposite thread pitches by rotational drive of the drive spindle 19 by way of the head portion 31.

The drive unit 4 has a total of four first entrainment members 37a-d. The entrainment members 37a, c are moved relative to the entrainment members 37b, d by a relative movement of the first slide 33 with respect to the second slide 35. Consequently, a first pair of the first entrainment members 37a, c is connected to the second drive slide 35 fixedly and rigidly relative to each other while a second pair of the first entrainment members 37b, d is connected to the first slide 33 of the drive unit 11 fixedly and rigidly relative to each other.

FIG. 4 further shows two support rails 39a, b which additionally support the entrainment members in the interior of the housing 3 and guide them in their movement. The entrainment members 37a-d respectively have on the lower side in FIG. 4 (partly concealed) projections 41, which are of a configuration corresponding to the guides 27a-d and can slide therein without play. Further details regarding the drive unit will be seen in FIG. 5.

Figure 5:
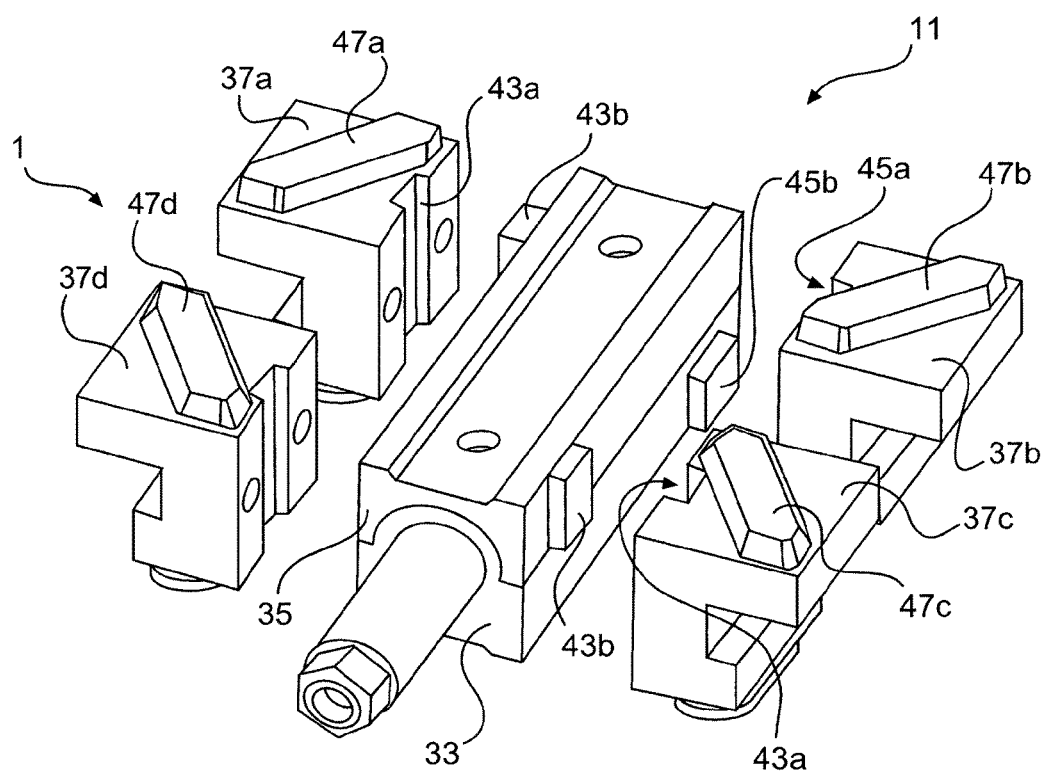
FIG. 5 shows an exploded view of the drive unit of FIG. 4.

FIG. 5 shows the coupling of the entrainment members 37a-d to the slides 33, 35 of the drive unit 11. The entrainment members 37a, c can be coupled to the second slide 35 by means of grooves 43a of a corresponding configuration and projections 43b. In a similar manner, the entrainment members 37b, d can be coupled to the first slide 33 of the drive unit 11 by means of corresponding grooves 45a and projections 45b. At their side surface which is upward in FIG. 5, the entrainment members 37a-d each have a respective projection 47a-d. The adjacent projections 47a, b of the entrainment members 37a, b, which are movable relative to each other, are in mutually parallel relationship. The projections 47c, d of the adjacent entrainment members 37c, d, which are movable relative to each other, are also in mutually parallel relationship.

Figure 6:
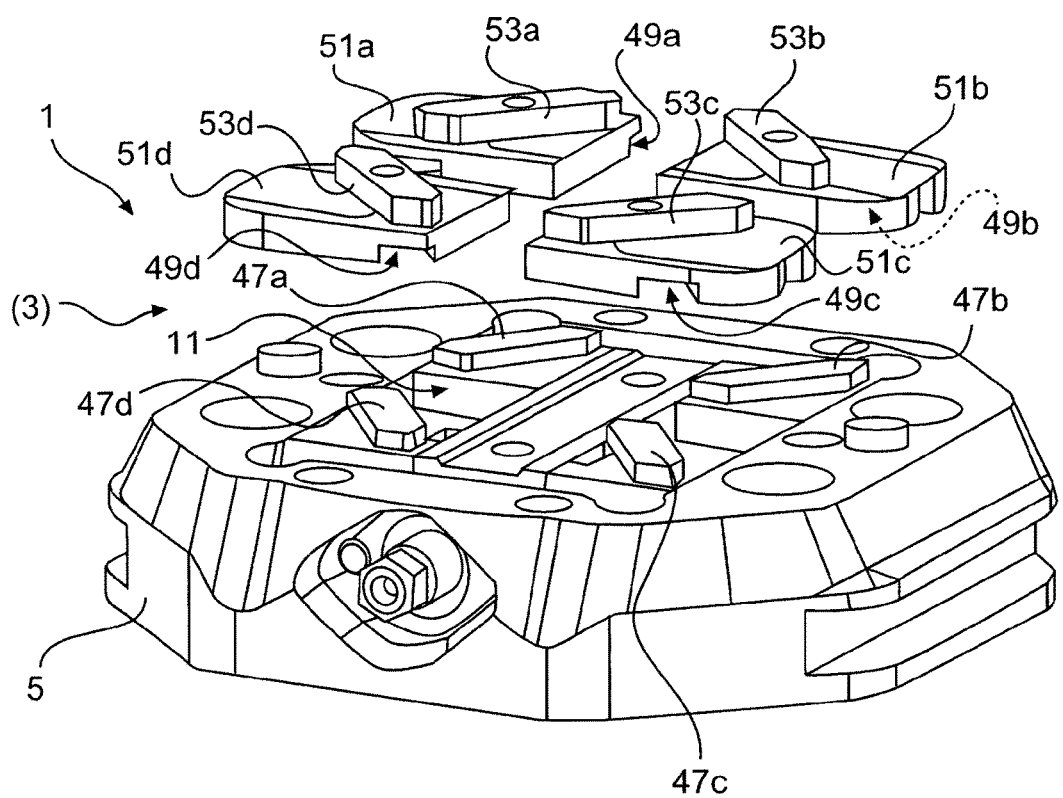
FIG. 6 shows an exploded view of parts of the compensating chuck of FIGS. 1 through 3 and the drive unit of FIGS. 4 and 5.

As already shown in FIG. 2, the drive unit 11 described in greater detail with reference to FIGS. 4 and 5 is fitted into the housing 3 in the view in FIG. 6. A total of four second entrainment members 51a-d are shown above the lower part 5 of the housing 3 of the compensating chuck 1. At their underside, the second entrainment members 51a-d have a respective opening 49a-d. The openings 49a-d serve as a sliding guide and are adapted for preferably play-freely receiving the corresponding projections 47a-d of the first entrainment members 37a-d (FIG. 5). The second entrainment members 51a-d have a respective projection 53a-d at their side opposite to the openings 49a-d.

While the first entrainment members 37a-d (FIGS. 4 and 5) are movable within the opening 21 (FIG. 2) in the housing 3 in a first direction, preferably parallel to a first axis of movement, the second entrainment members 51a-d are movable in a second direction different from the first axis, preferably in orthogonal relationship with the direction of the first axis. That is achieved by the second entrainment members 51a-d being fitted into corresponding guides, which are let in the form of openings 55a, b into the underside of the upper part 7 of the housing 3. The second entrainment members 51a, b are, for example, guided movably in the opening 51b while the second entrainment members 51c, d are movably guided in the opening 55a, in each case preferably without play.

Figure 7:
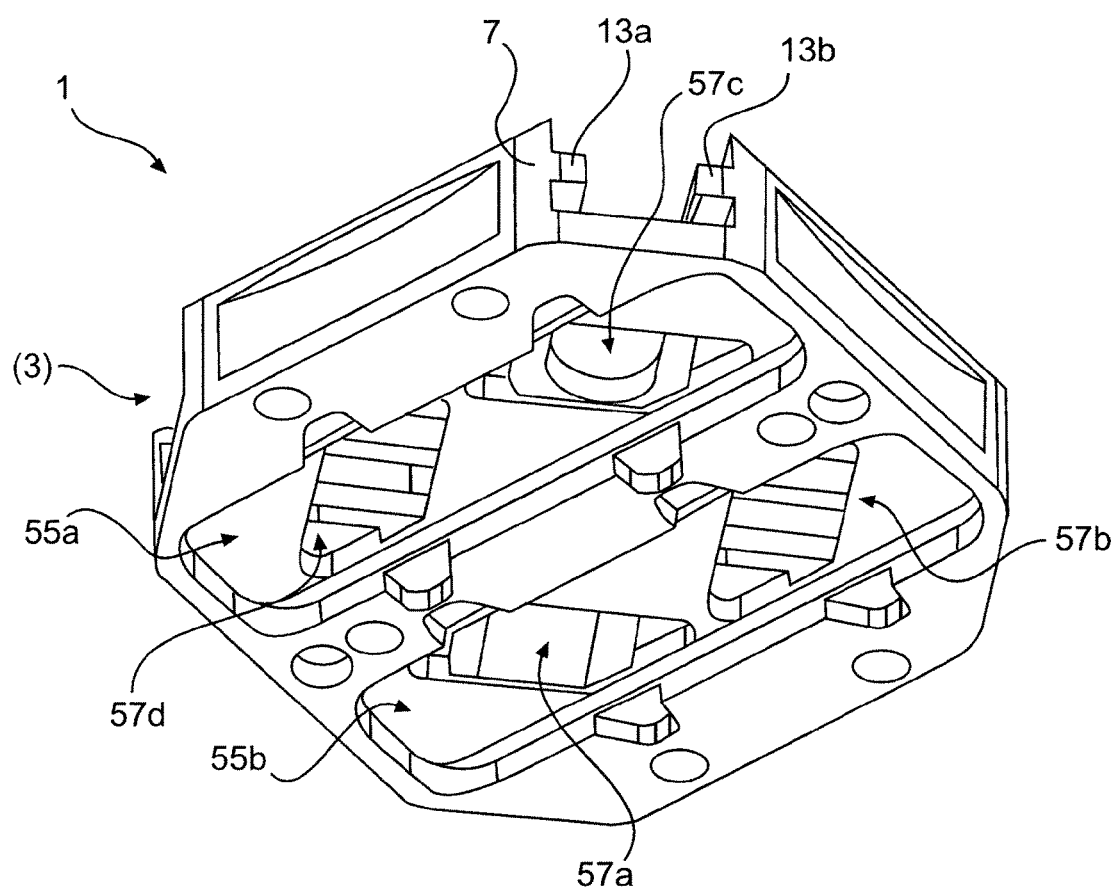
FIG. 7 shows a further perspective view of a part of the compensating chuck as shown in the foregoing Figures.

As can further be seen from FIG. 7, apertures are let into the housing 3 from the openings 55a, b, which apertures extend into the openings for receiving the main jaws 9a-d. The apertures are denoted by references 57a-d.

Figure 8:
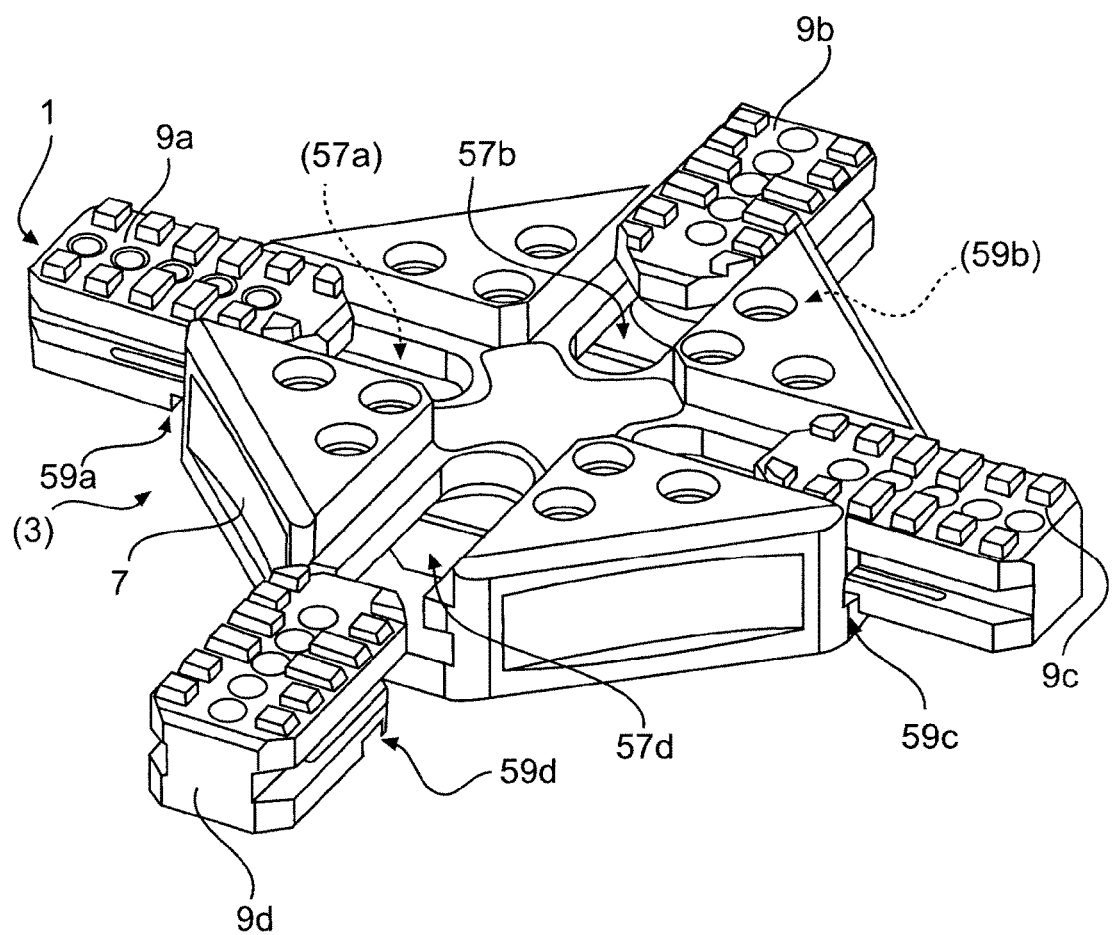
FIG. 8 shows a further perspective view of the partly assembled compensating chuck as shown in the foregoing Figures.

The upper part 7 of the housing 3 is shown as a perspective view from below in FIG. 7, while in FIG. 8 it is shown as a perspective view from above, with respect to the orientation of the compensating chuck for example in FIG. 1. In FIG. 8, the main jaws 9a-d are partly introduced into the guide openings provided for same in the housing 3. It can be seen in part from FIG. 8 that, on their side which in the assembled condition faces in the direction of the apertures 57a-d, the main jaws 9a-d have a respective opening 59a-d. The openings 59a-d serve as a receiving means, preferably as a sliding guide means, for the projections 53a-d (FIG. 6) of the second entrainment members 51a-d. A movement of the second entrainment members 51a-d in the second direction of movement, which is predetermined by the openings 55a-b, is converted by coupling to the main jaws 9a-d into a movement in the direction of the corresponding openings which carry the main jaws 9a-d.

Figure 9:
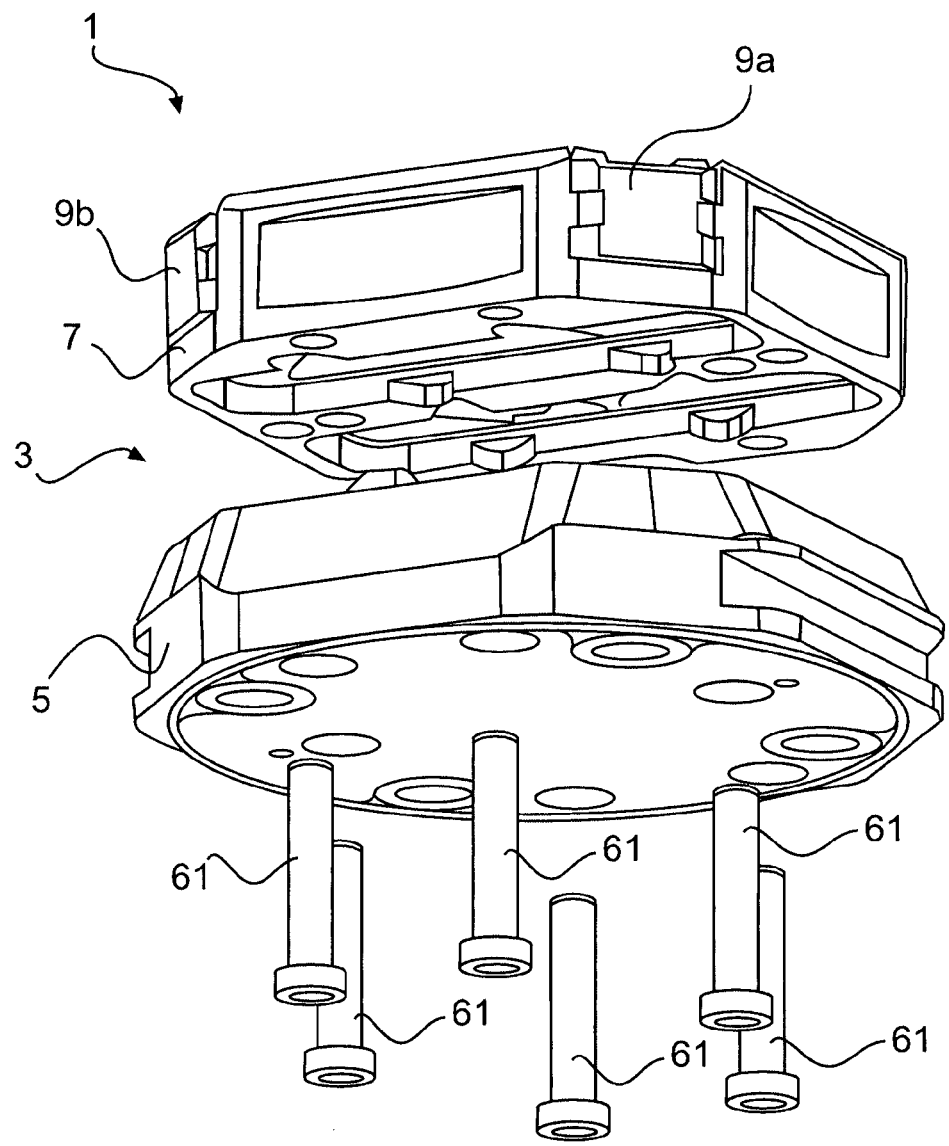
FIG. 9 shows a further perspective view of a partly assembled condition of the compensating chuck as shown in the foregoing Figures.

Bringing the lower part 5 and the upper part 7 of the housing 3 together, as shown in FIG. 9, gives the completely assembled condition shown in FIG. 1. As shown for example in FIG. 9, fixing can be effected by means of one or more screw connections 61.

While FIGS. 1 through 9 show the structural configuration of the compensating chuck 1 according to the invention following, FIGS. 20 through 14 show in particular the functional interplay of the individual components.

While the reference numerals for some structural parts of the chuck from FIG. 1 through to which attention is directed in this respect are again shown in FIGS. 10a-d, in FIGS. 11a-d, 12a-d, 13a-d and 14a-d only the respective parts which are part of the transmission of the compensating chuck 1 or co-operate therewith are respectively provided with references, for the sake of clarity of the drawing.

Figure 10A:
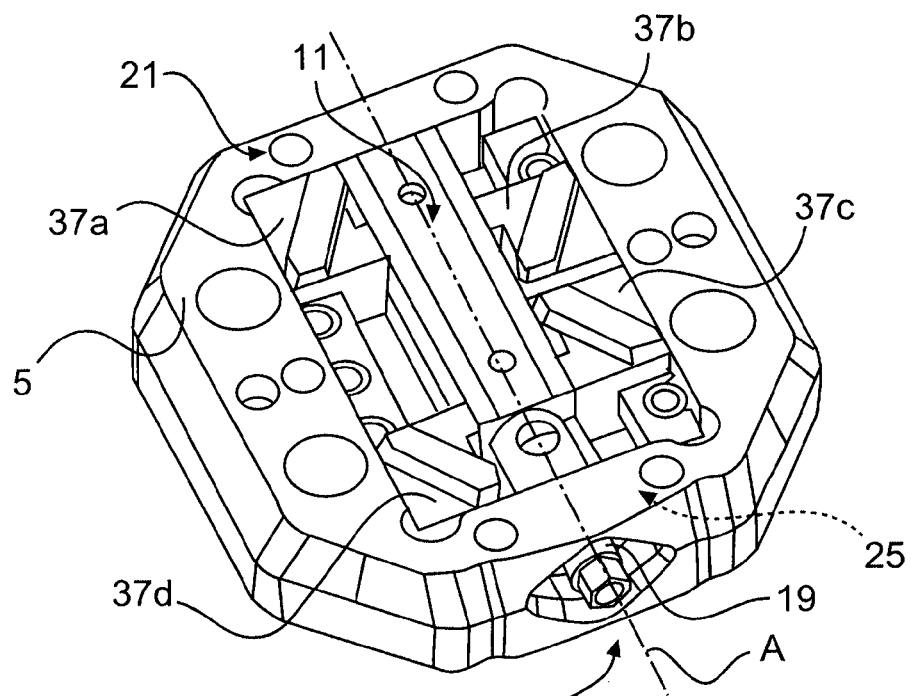
FIGS. 10a-d show various views of the compensating chuck as shown in the foregoing Figures in a first operating condition.

The compensating chuck 1 is shown in a first operating position in FIGS. 10a-d. The first operating position corresponds to a position with the main jaws 9a-d opened to maximum width, that is to say moved away from each other to their maximum. As shown in FIG. 10a, the drive unit 11 has been moved by drive of the drive spindle 19 in such a way that the first pair of first entrainment members 37a, c and the second pair of first entrainment members 37b, d respectively remain in a first end position. The first entrainment member 37a is in contact with the abutment surface 21 while the first entrainment member 37d is in contact with the opposite abutment surface 25.

Figure 10B:
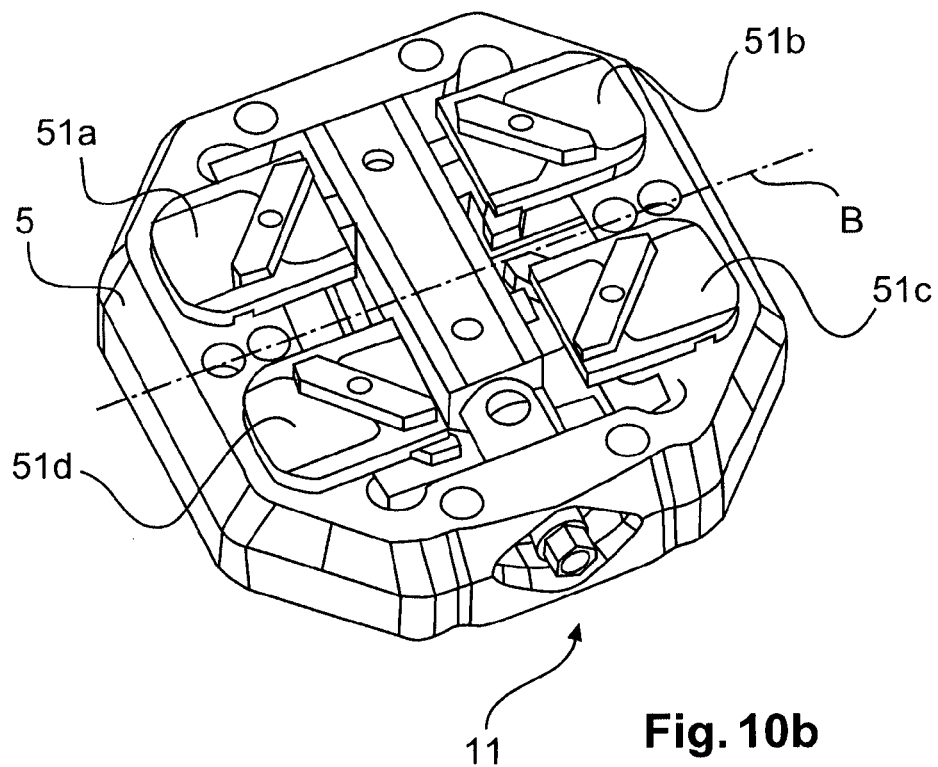

The second entrainment members 51a-d, which are in engagement with the first entrainment members 37a-d by means of their sliding guides, are in this condition moved into an end position which is at the left (second entrainment member 51a, d) or at the right (second entrainment member 51b, c) (see FIG. 10b).

The first entrainment members have been moved into their respective position by displacement parallel to the direction of the axis A while the second entrainment members 51a-d have been moved into the illustrated position by corresponding displacement parallel to the direction of the axis B.

Figure 10C:
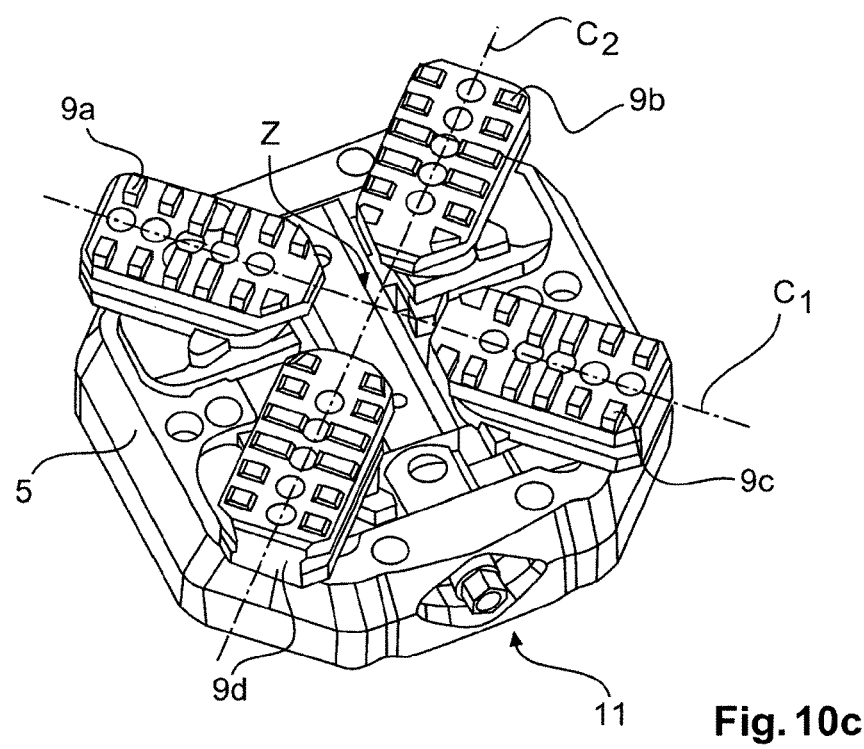
Figure 10D:
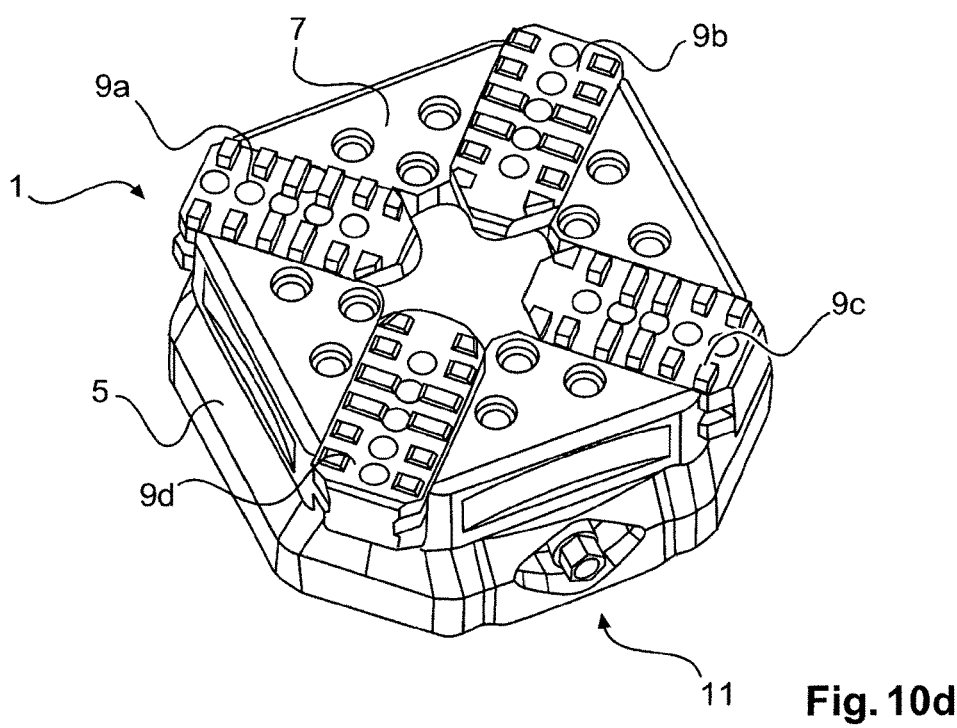

The main jaws 9a-d, which are shown in FIG. 10c and which are oriented to a common center point Z, have been moved by movement in the direction of the axes C1 and C2 into the illustrated end position in which they are preferably all at the same spacing relative to the center point Z. That gives the condition of the compensating chuck 1, shown in FIG. 10.

If the drive unit 11 is activated starting from FIG. 10a-d, then all four first entrainment members 37a-d could now basically be moved if they are not prevented from moving. In that case, the first entrainment members 37a, c would be moved downwardly in the direction of the axis A while the first entrainment members 37b, d would be moved upwardly in the direction of the axis A. If in contrast the entrainment members 37a, c are impeded in their movement, they remain at their position upon actuation of the drive spindle 19 and only the entrainment members 37b, d are moved. That condition is shown in FIG. 11a-d. The entrainment members 37b, d have been moved upwardly in the direction of the arrow P1 along the axis A. As a consequence of the relative movement of only one of the pairs of entrainment members, the drive unit 11 has been correspondingly moved in the direction of the arrow P1 in comparison with the condition shown in FIG. 10, by its mass center of gravity having been displaced.

Figure 11A:
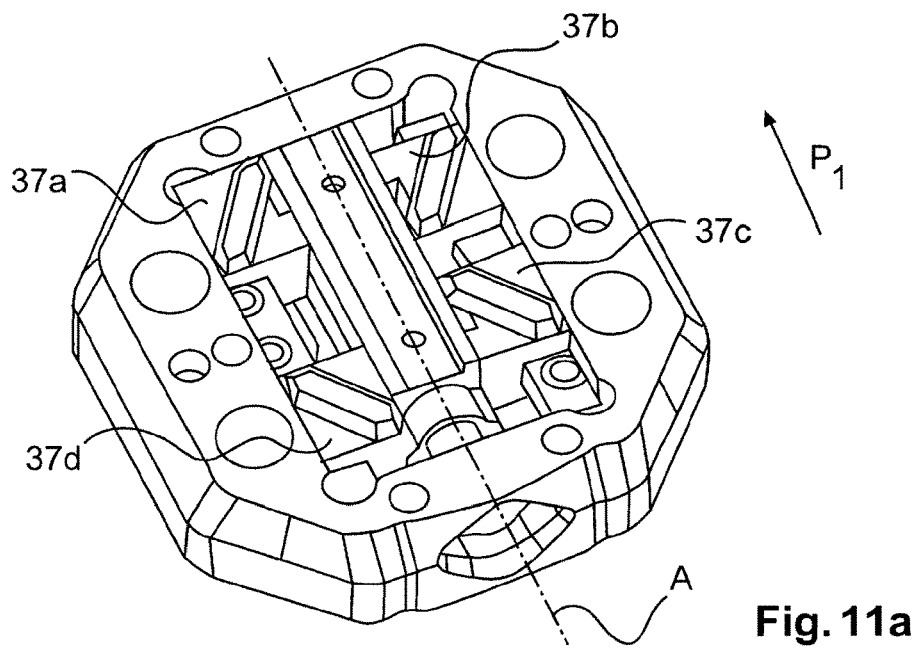
FIGS. 11a-d show various views of the compensating chuck as shown in the foregoing Figures in a second operating condition.
Figure 11B:
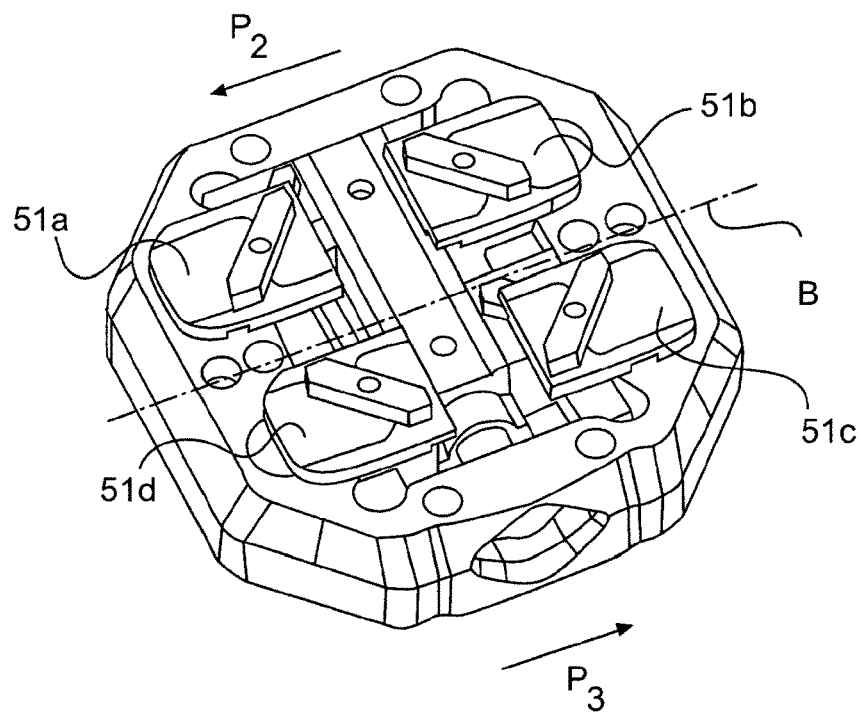

By virtue of the coupling of the first entrainment members to the second entrainment members 51a-d, the second entrainment members 51a, c as shown in FIG. 11b are unchanged at the same position as in FIG. 10b. However, the second entrainment members 51b, d have been moved in the direction of the arrow P2 and P3, respectively, along the axis B towards the left and the right respectively. The setting angles of the projections on the first entrainment members 37a-d and the projections corresponding thereto of the second entrainment members 51a-d are preferably so selected that the second entrainment members 51b, d and the second entrainment members 51a, c each move precisely to the same extent when the first entrainment members 37b, d and 37a, c are moved.

Figure 11C:
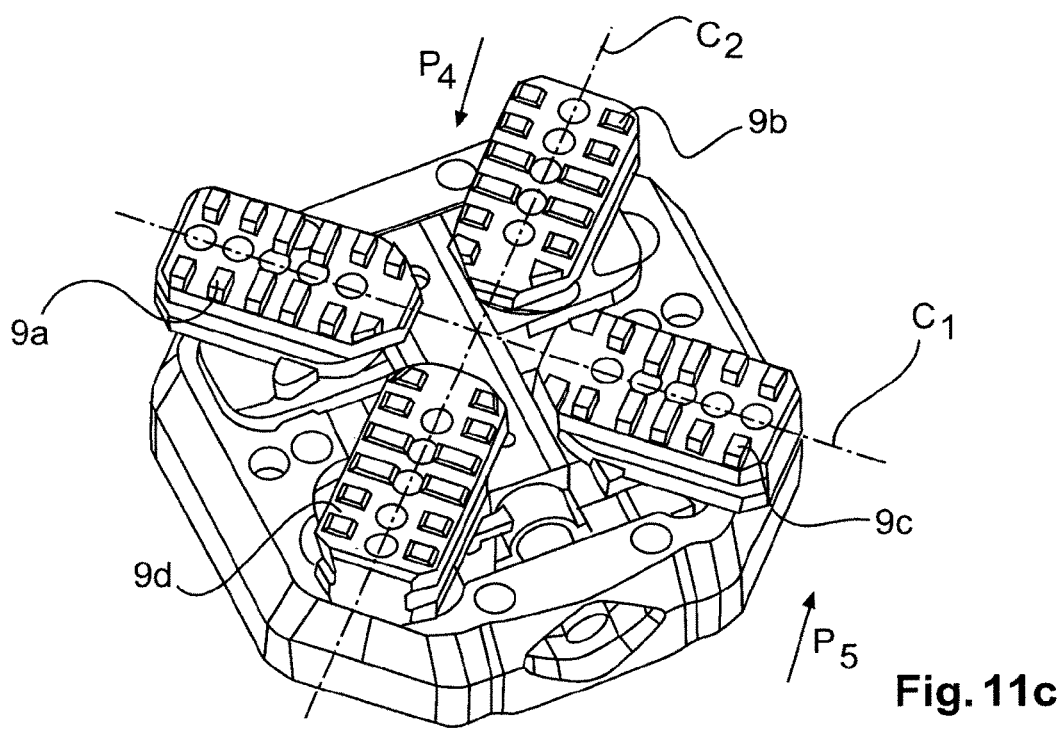
Figure 11D:
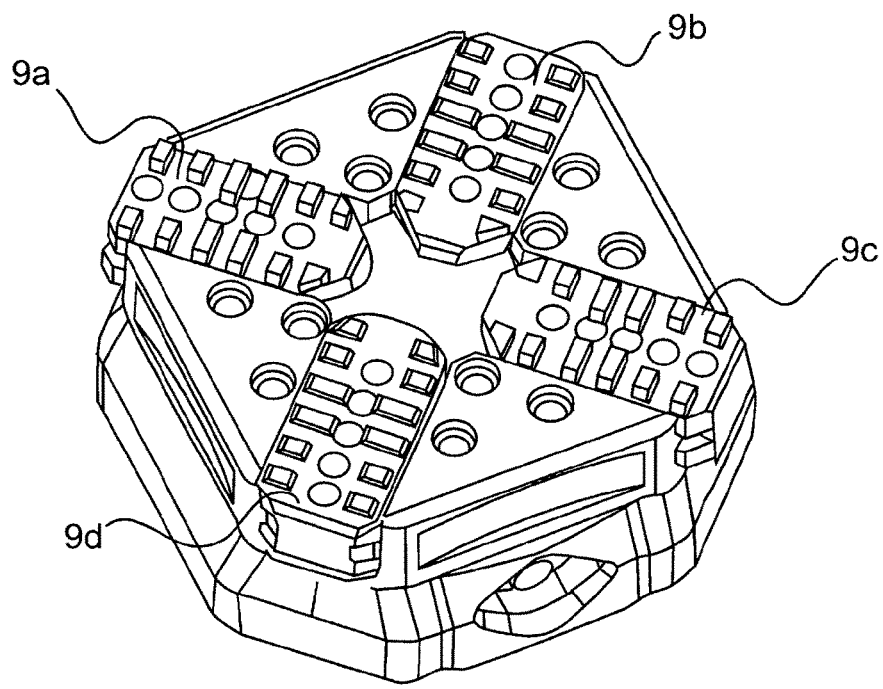

As can be seen from FIGS. 11c and 11d, the main jaws 9b, d coupled to the second entrainment members 51b, d have each been moved to the same extent in the direction of the chuck center point Z. The relative movement between the adjacent main jaws 9a, b and 9b, c and 9c, d and 9d, a respectively has consequently been made possible by the drive unit 11 being mounted movably within the opening 21 so that it could be moved in the condition of FIG. 10 to the condition shown in FIG. 11.

Figure 12A:
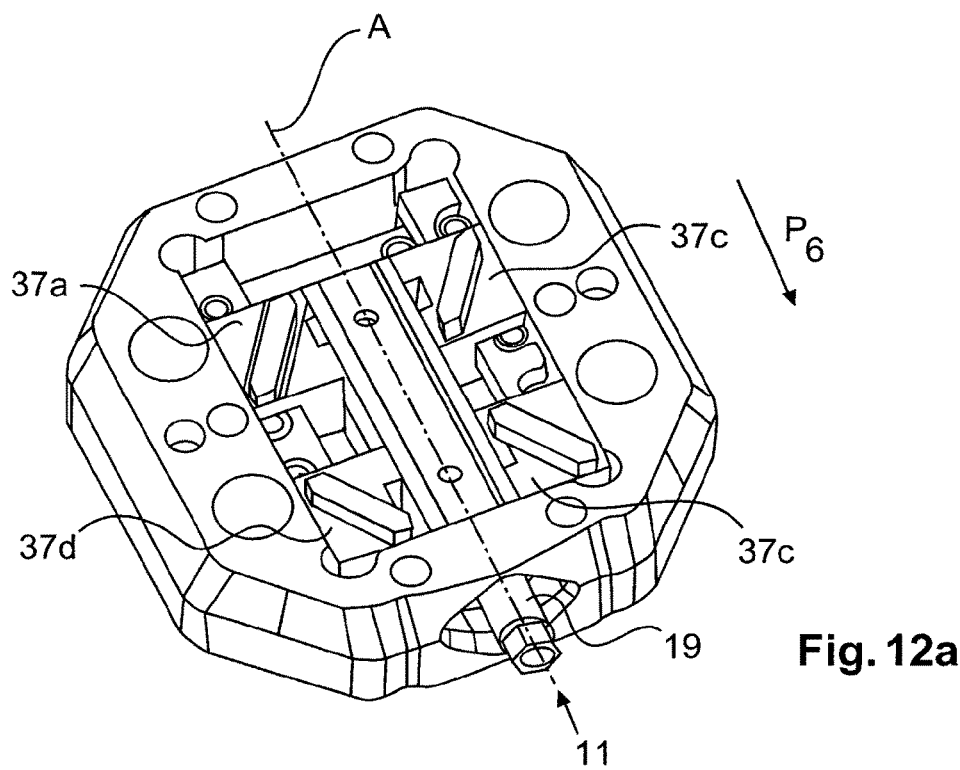

As an alternative to the movement into the condition shown in FIG. 11, starting from the basic position shown in FIG. 10, movement into the condition shown in FIGS. 12a-d is also possible. FIG. 12a shows that the position of the first entrainment members 37b, d has remained unchanged in comparison with FIG. 10a while however the first entrainment members 37a, c have been moved from their end position shown in FIG. 10a into the opposite end position of FIG. 12a so that the first entrainment member 37c bears against the abutment surface 25, like also the first entrainment member 37d. The entrainment members 37a, c have consequently been moved with the slider connecting them in the direction of the arrow P6 along the axis A.

Figure 12B:
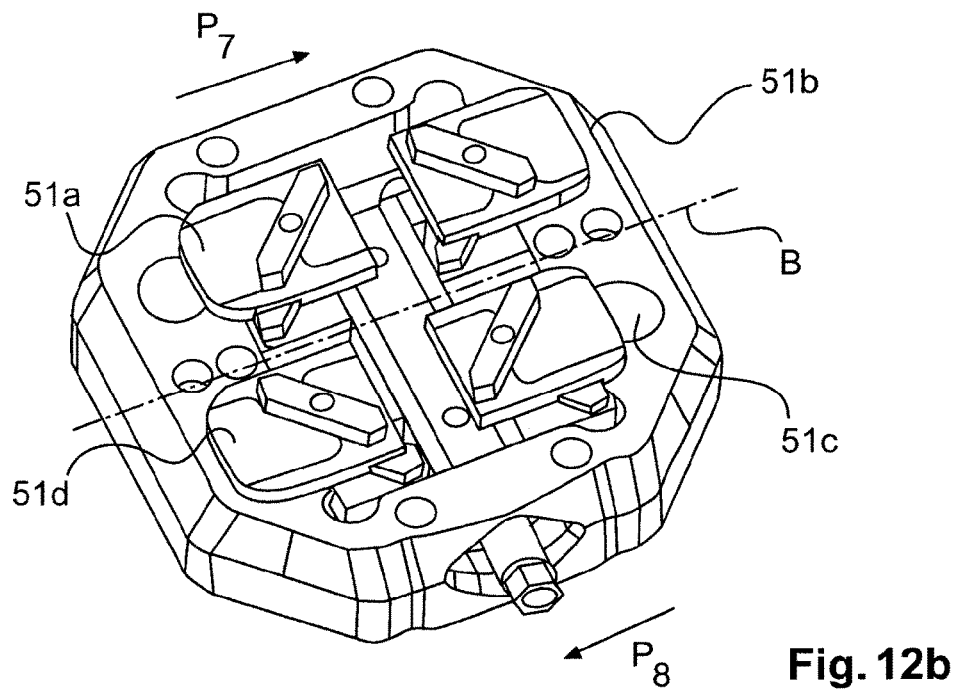
Figure 12C:
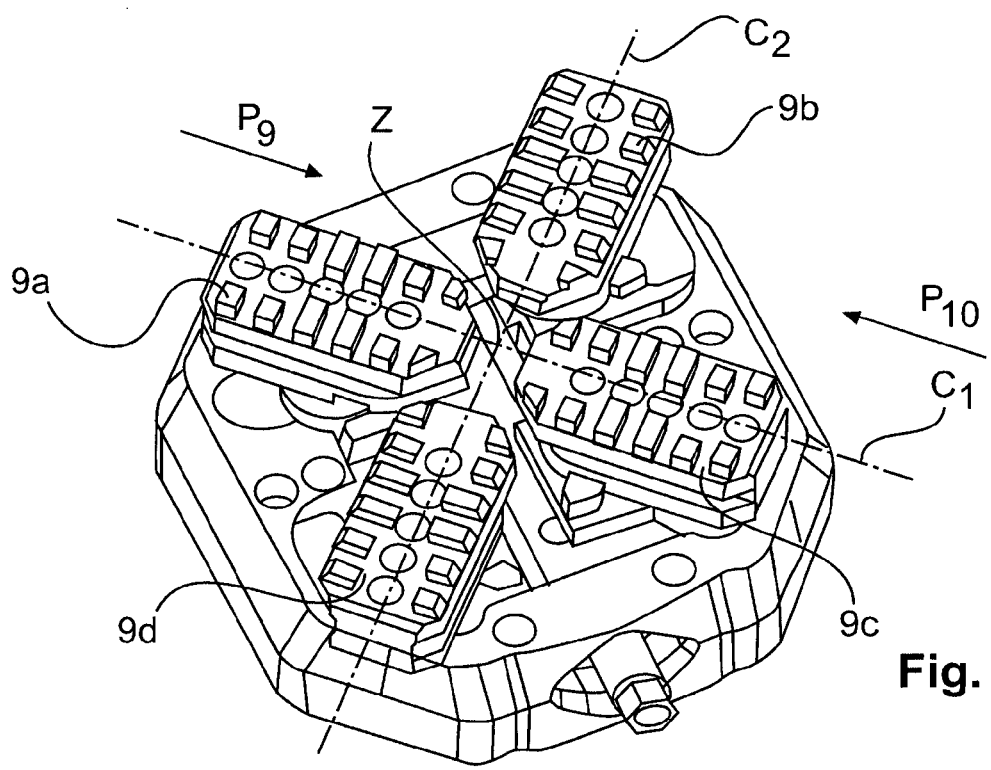
Figure 12B:
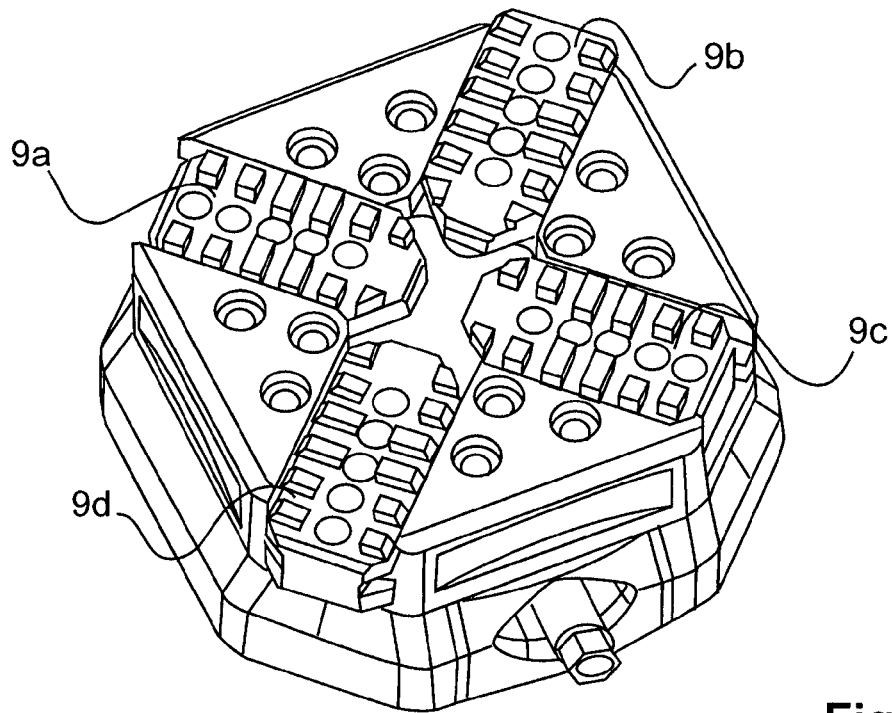

FIG. 12b consequently shows that the second entrainment members 51b, d are unchanged in that position as can already be seen in FIG. 10b, namely entirely to the left (second entrainment member 51d) and entirely to the right (second entrainment member 51b). By virtue of the relative movement of the first entrainment members 37a, c, however, the second entrainment member 51a has been moved in the direction of the arrow P7 and the second entrainment member 51c has been moved in the direction of the arrow P8, towards the right and the left respectively. By virtue of the limitation due to the abutment surfaces of the opening 21, the main jaws 9a, 9c are now in their position which is as close as possible to the center point Z, as shown in FIGS. 12c, d, while the main jaws 9a, 9c have been displaced inwardly along the axis C1 in the direction of the arrows P9 and P10 respectively. It will be clear therefrom that the maximum unequal setting of the pairs of main jaws 9a, c and 9b, d, respectively, relative to each other is determined by the conditions in which the adjacent first entrainment members 37a, b and 37c, d jointly bear against one of the abutment surfaces 23, 25 delimiting the opening 21. 15

Figure 13A:
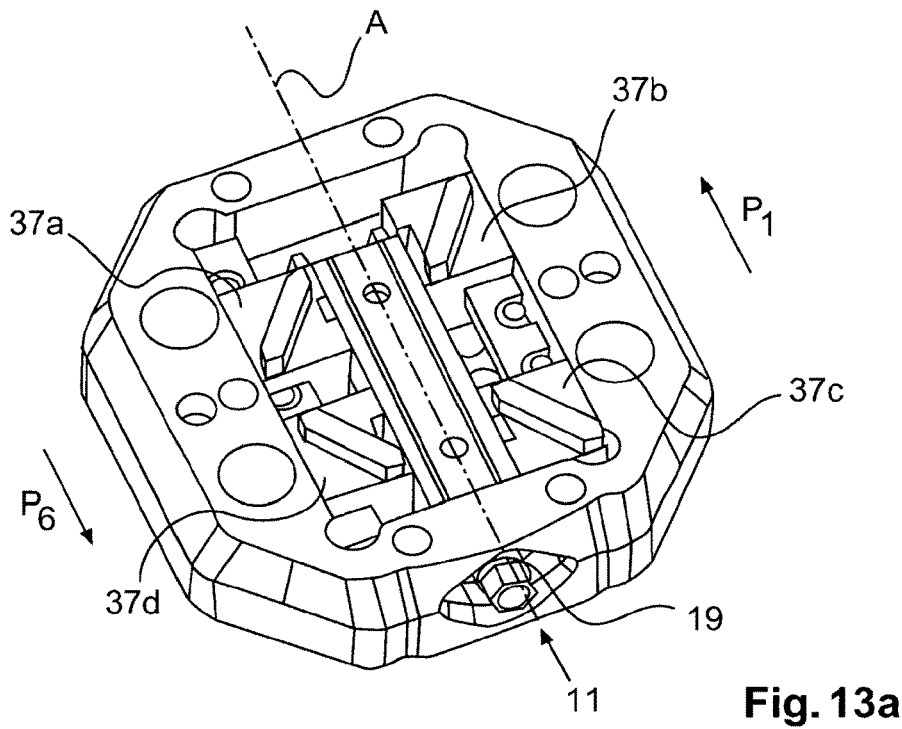
FIGS. 13a-d show various views of the compensating chuck as shown in the foregoing Figures in a fourth operating condition.
Figure 13B:
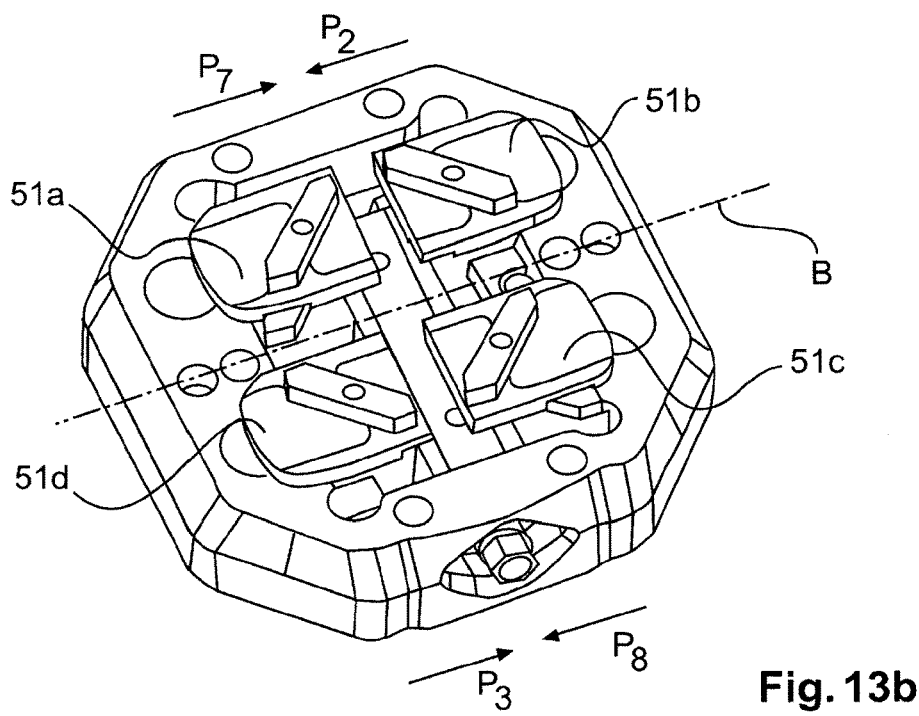

FIGS. 13a-d show an operating condition which considered abstractly is composed of the two conditions shown in FIGS. 11 and 12 and which is achieved for example if, starting from the condition reached in FIG. 12a-d, the drive of the drive unit 11 is continued. In addition to the displacement of the entrainment members 37a, c a relative movement of the entrainment members 37b, d in relation to the entrainment members 37*a, c* is achieved by further movement and further deflection or sliding motion of the drive unit 11 in the opening 21 so that the one pair of entrainment members 37*a, c* is displaced in the direction of the arrow P6 while the other pair of entrainment members 37*b, d* is displaced in the direction of the arrow P1. That is also shown in the condition of the second entrainment members 51*a-d* as shown in FIG. 13*b*. The second entrainment members 51*a, c* are displaced in the direction of the arrows P7, P8, while the second entrainment members 51*b, d* have been moved in the direction of the axis B.

Figure 13C:
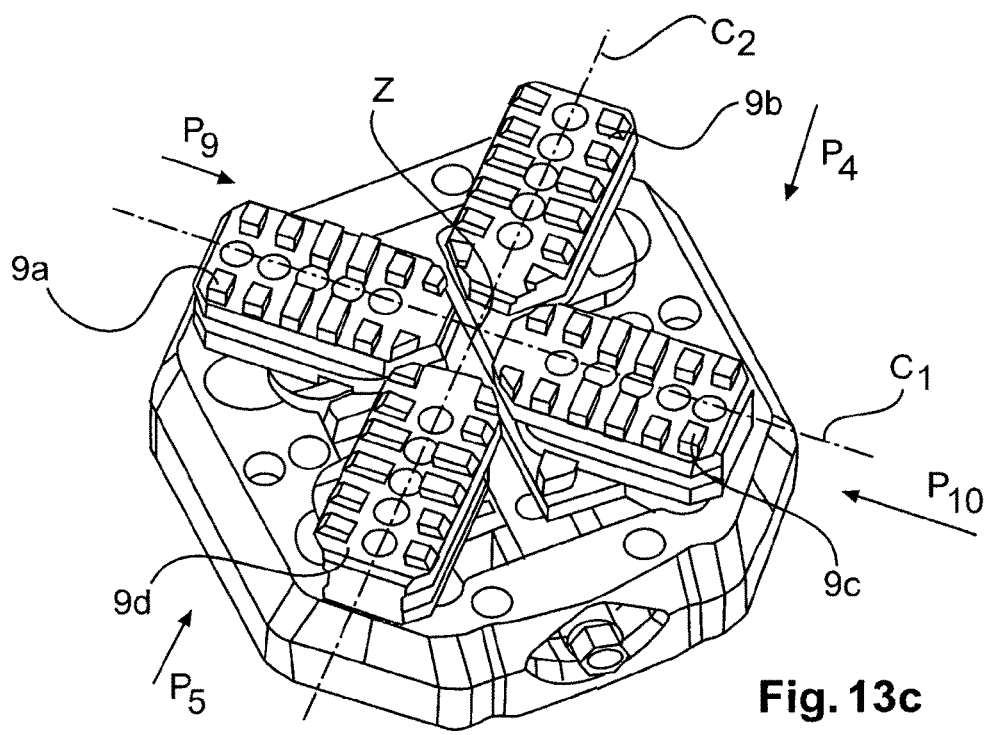
Figure 13D:
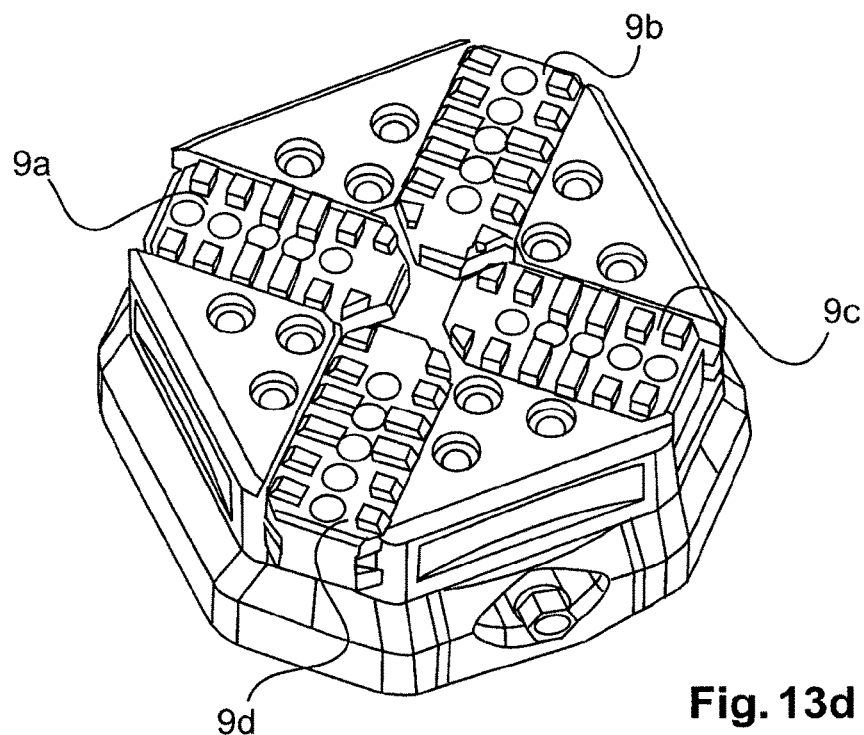

Consequently FIGS. 13*c* and 13*d* show the condition of the main jaws 9*a-d* in which the main jaws 9*a, c* have been moved in the direction of the arrows P9 and P10 towards the common center point Z and the main jaws 9*b*, 9*d* have been moved in the direction of the arrows P4, P5 in the direction towards the center point Z.

Finally, FIGS. 14*a-d* show the end condition of the compensating chuck 1, opposite to the condition shown in FIGS. 10*a-d*. In the condition shown in FIGS. 14*a-d*, the first entrainment members 37*a, c* have been moved in the direction of the arrow P6 into a second end position corresponding to the maximum clamping position. The first entrainment members 37*b, d* have been moved in the direction of an arrow P11 in the drawer of the axis A into their second end position and thus to such an extent that the first entrainment member 37*b* has been brought into contact with the abutment surface 23. Accordingly, both the pair of second entrainment members 51*b, d* and also the pair of second entrainment members 51*a, c* have each been moved to the maximum extent towards each other in the direction of the axis B. This corresponds to a movement of the second entrainment members 51*a, c* along the arrows P7, P8 and the second entrainment members 51*b, d* in the direction of the arrows P12, P13.

Figure 14A:
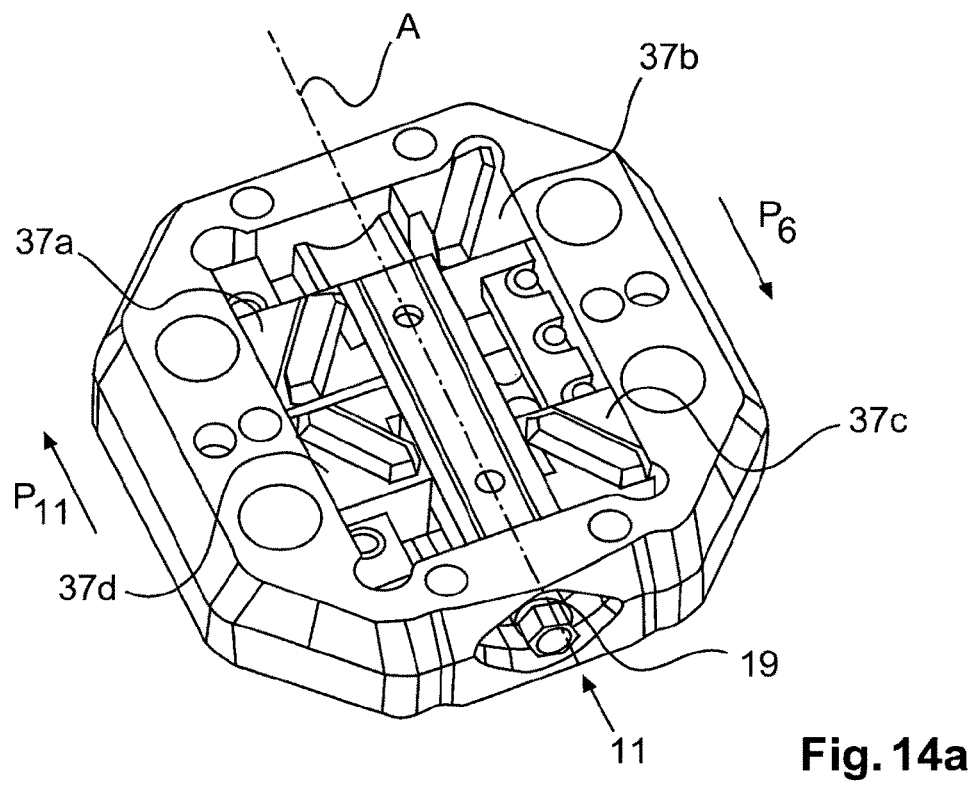
FIGS. 14a-d show various views of the compensating chuck as shown in the foregoing Figures in a fifth operating condition.
Figure 14B:
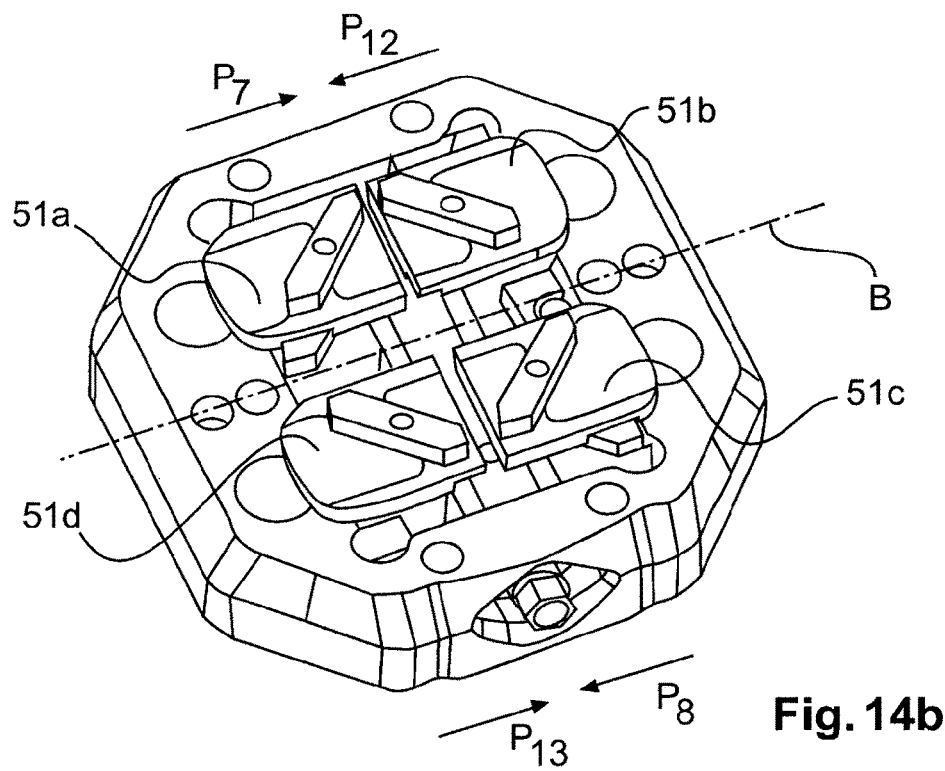
Figure 14C:
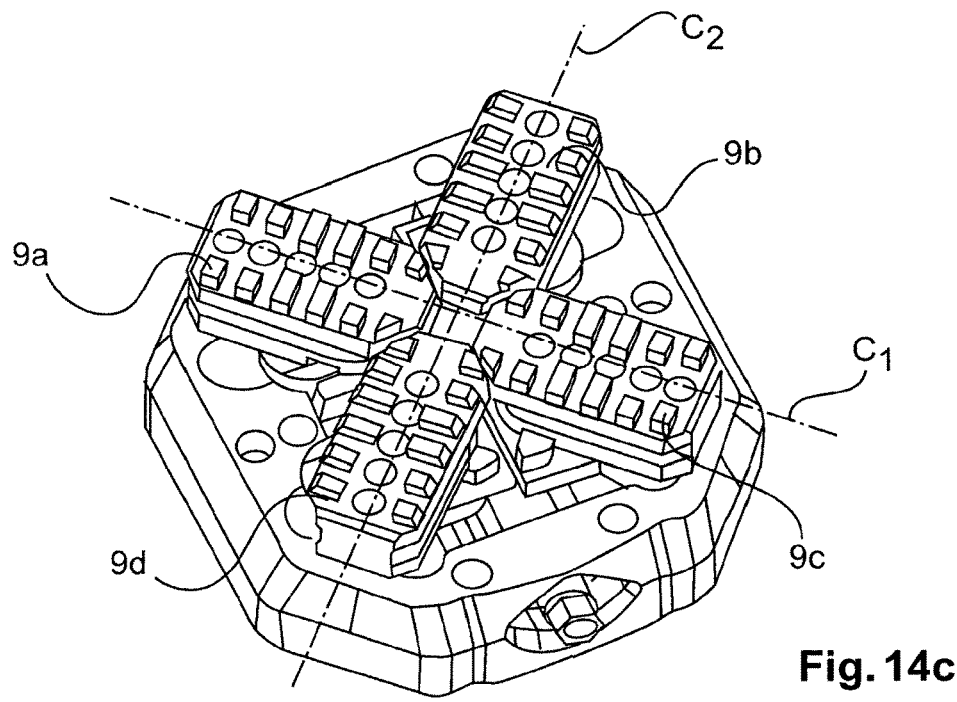
Figure 14D:
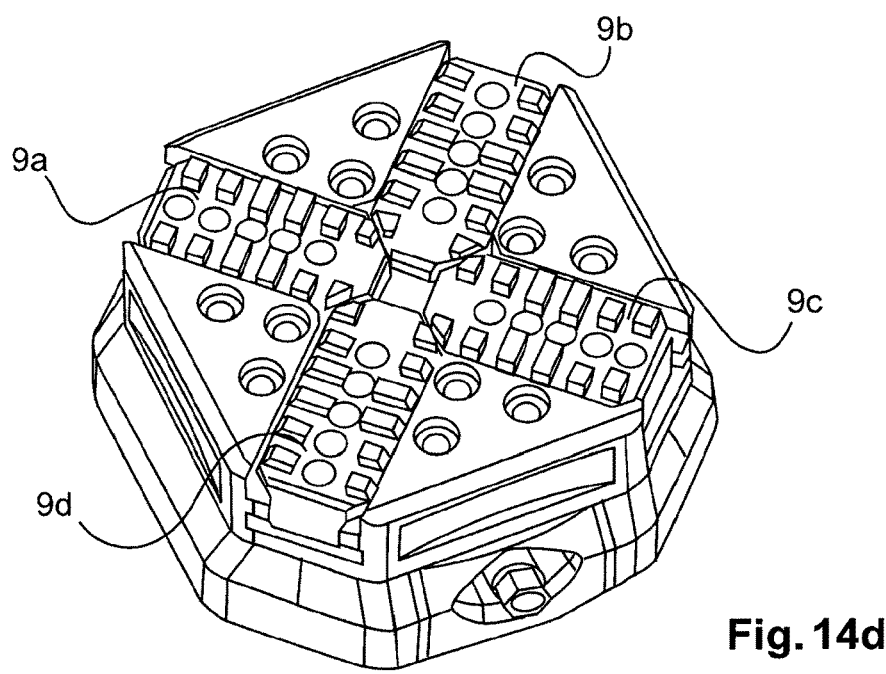

As can be seen from FIGS. 14*c, d*, in the condition shown in FIG. 14 both the pair of main jaws 9*a, c* and also the pair of main jaws 9*b, d* are in their maximum clamping position, arranged as close as possible in relation to the center point Z of the compensating chuck 1.

As can be seen from the foregoing description, the transmission including the first entrainment members 37*a-d*, second entrainment members 51*a-d* and main jaws 9*a-d* ensures a movement which is central at any time in respect of the mutually opposite main jaws and also a generous compensation option in regard to the relative movement of adjacent main jaws. As all moved transmission members are moved in the horizontal direction and for the major part are in the form of flat bodies (in particular, the entrainment members 37*a-d* and 51*a-d*), it is possible to achieve a compensating chuck which is very compact in respect of its structural height and which also ensures a superior transmission of force by virtue of very short lever ratios. The direct structure of the drive unit with its drive spindle for applying the force to the entrainment members 37*a-d* further permits both a clamping mode using manual force and also a clamping mode involving motor support.

FIGS. 15 through 21 relate to a compensating chuck 101 in accordance with a second embodiment which is designed in accordance with the second aspect of the present invention. Essential basic features of the compensating chuck 101 in accordance with the second preferred embodiment are the same as or similar to the functions of the above-described compensating chuck 1 according to the first embodiment. Functional differences lie in the precise mode of operation of the drive unit, on which the description hereinafter very substantially concentrates.

Figure 15:
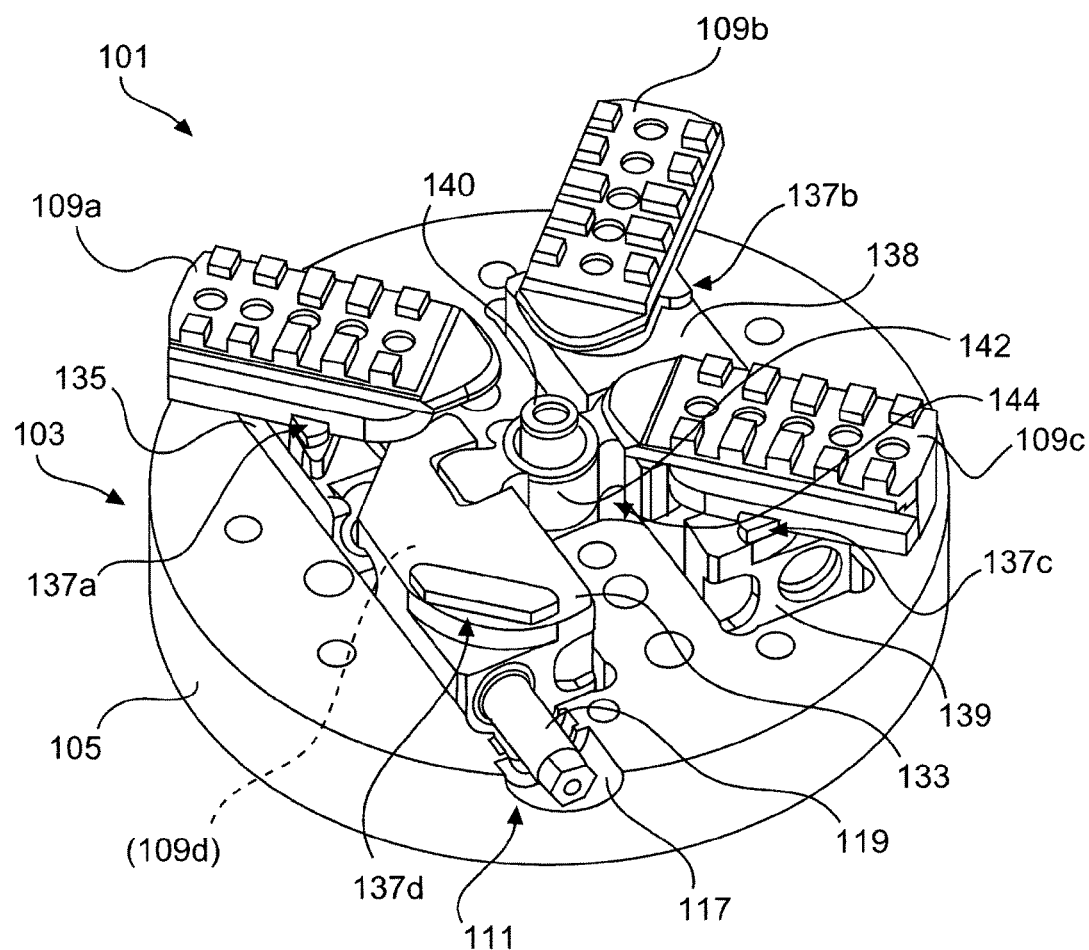
FIG. 15 shows a perspective view of a partly assembled compensating chuck according to a second embodiment according to the present invention.

The compensating chuck 101 has a drive unit 111. The drive unit 111 is mounted slidingly, preferably without play, in a corresponding opening in a lower housing part 105 of a housing 103. An upper housing part (not shown) is adapted to receive a plurality of main jaws 109*a-d*. As shown in FIG. 15, a total of four main jaws 109*a-d* are arranged in mutually opposite relationship in pairs, are oriented in concentric relationship with each other and are let into corresponding openings in the housing. The main jaws 109 are guided slidingly, preferably without play, in the housing 103. As in the compensating chuck 1 of FIGS. 1 through 14, the guide action is afforded by respective parallel guide rails and suitable corresponding projections. On their outside surface directed upwardly in FIG. 15, the main jaws 109 have respective coupling means for connection to clamping jaws of a corresponding configuration.

The drive unit 111 has a drive spindle 119, the engagement portion of which extends together with a wrench through an opening 117 in the lower housing part 105. The drive spindle 119 is connected to a first slide 133 by means of a first thread portion and to a second slide 13 by means of a second thread portion. The slides 133, 135 are mounted slidingly, preferably without play, within the housing 103.

A first entrainment member 137*a* together with a corresponding projection are fixedly arranged on the first slide 135. A further first entrainment member 137*d* with corresponding projection is fixedly arranged on the second slide 135. The entrainment members 137*a, d* are movable towards and away from each other by means of the drive from the drive spindle 119. The entrainment members 137*a, d* are respectively in engagement with a main jaw 109*a, d* associated therewith. Provided between the entrainment members 137*a, d* and the main jaws 109*a, d* is a respective sliding guide, which converts the movement of the entrainment members 137 into a radial movement of the main jaws 109.

The embodiment of the compensating chuck 101 shown in the second embodiment further includes a third slide 138 and a fourth slide 139. A further entrainment member 137*b* with a corresponding projection is arranged fixedly on the third slide. A further entrainment member 137*c* with projection is (correspondingly) fixedly arranged on the fourth slide 139.

The slides 133, 138 and the entrainment members 137*b, d* are arranged in mutually diametrically opposite relationship, with respect to a substantially centrally arranged pin 140. In addition the slides 135, 139 are arranged in mutually diametrically opposite relationship in a similar fashion, with the entrainment members 137*a, c*, with respect to the pin 140.

The diametrically opposite pairs of entrainment members 137*a, c*; 137*b, d* are connected together by means of a respective coupling member 142, 144. The coupling members 142 and 144 are respectively pivotably mounted to the pin 140. As a result, the entrainment member 137*b* respectively performs a synchronous movement in the opposite direction, relative to the entrainment member 137*d*. Similarly, the entrainment member 137*c* always performs a synchronous opposite movement, relative to the movement of the entrainment member 137*a*.

Figure 16:
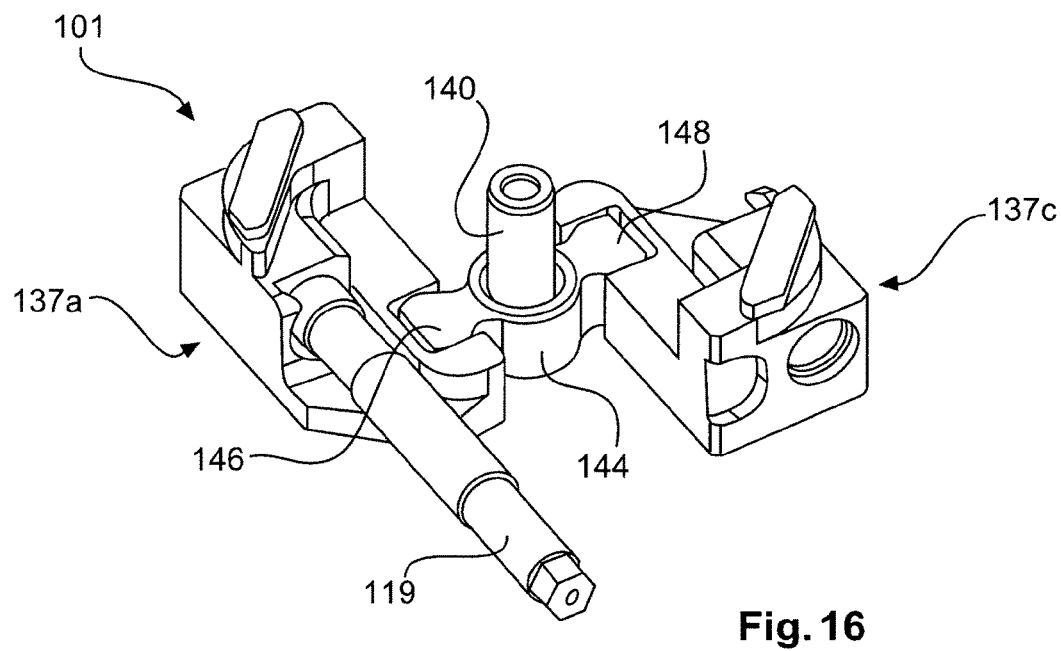
FIG. 16 shows a further perspective view of a part of the compensating chuck of FIG. 15.
Figure 17:
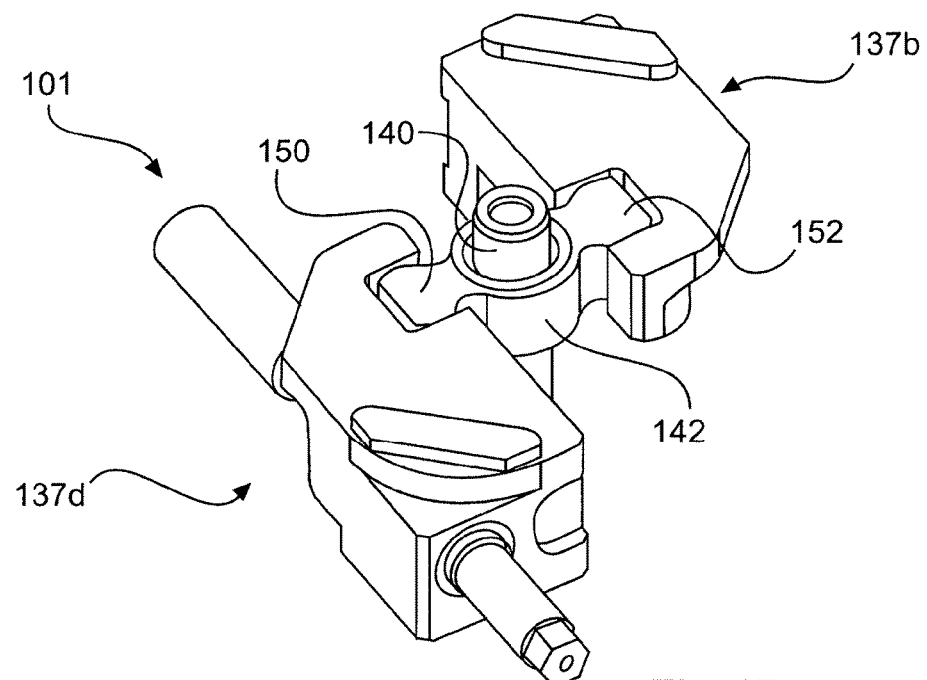
FIG. 17 shows a further perspective view of a part of the compensating chuck of FIGS. 15 and 16, FIGS. 18a, b show various views of the compensating chuck of FIGS. 15 through 17 in a first operating condition.

FIGS. 16 and 17 show details of the compensating chuck of FIG. 15. It will be seen, in particular, that coupling of the entrainment members 137*a, c* and 137*b, d* is effected by means of the coupling members 142, 144. The coupling member 142 has two projections 150, 152 engaging into respective corresponding openings in the slides or entrainment members 137*b, d*. A pivotal movement of the coupling member 142, by virtue of the guided mobility of the entrainment members 137b, d, results in a linear movement in opposite directions of the entrainment members 137b, d. The same applies to the entrainment members 137a, c which are connected together by the coupling member 144. The coupling member 144 has two projections 146, 148 which respectively engage into corresponding openings in the entrainment members 137a, c.

The mode of operation of the compensating chuck 101 in the second embodiment is described in further detail in a similar manner to the first embodiment, by reference to various operating conditions.

Figure 18A:
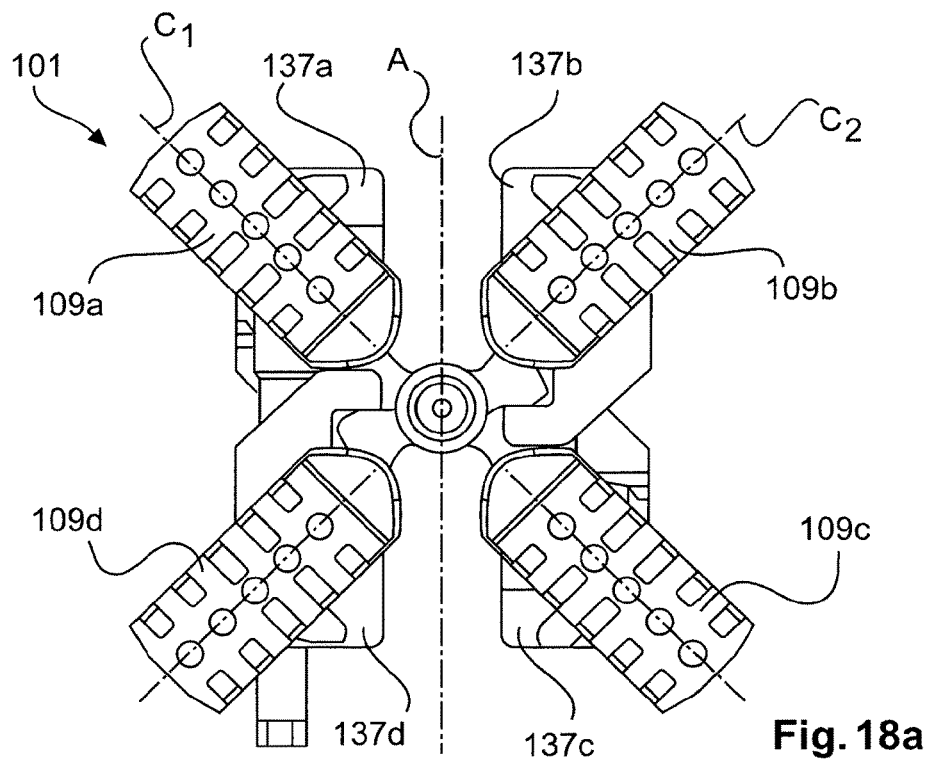

Referring to FIG. 18a, b, the compensating chuck 101 is shown in a first operating condition. In that operating condition the four entrainment members 137a-d are in a basic position, for example at maximum spacing from each other. The entrainment members 137a-d are movable towards and away from each other in the direction of the axis A. The main jaws 109a-d in engagement with the entrainment members 137a-d are movable towards and away from each other in respectively opposite relationship by virtue of the sliding guide transmission provided between them, in the direction of the axes C1 and C2.

The movement of the entrainment members 137a, d towards each other by means of the drive from the drive device leads to a pivotal movement of the coupling members which are respectively in engagement, whereby the respectively coupled entrainment members 137c, b are also moved synchronously.

Figure 18B:
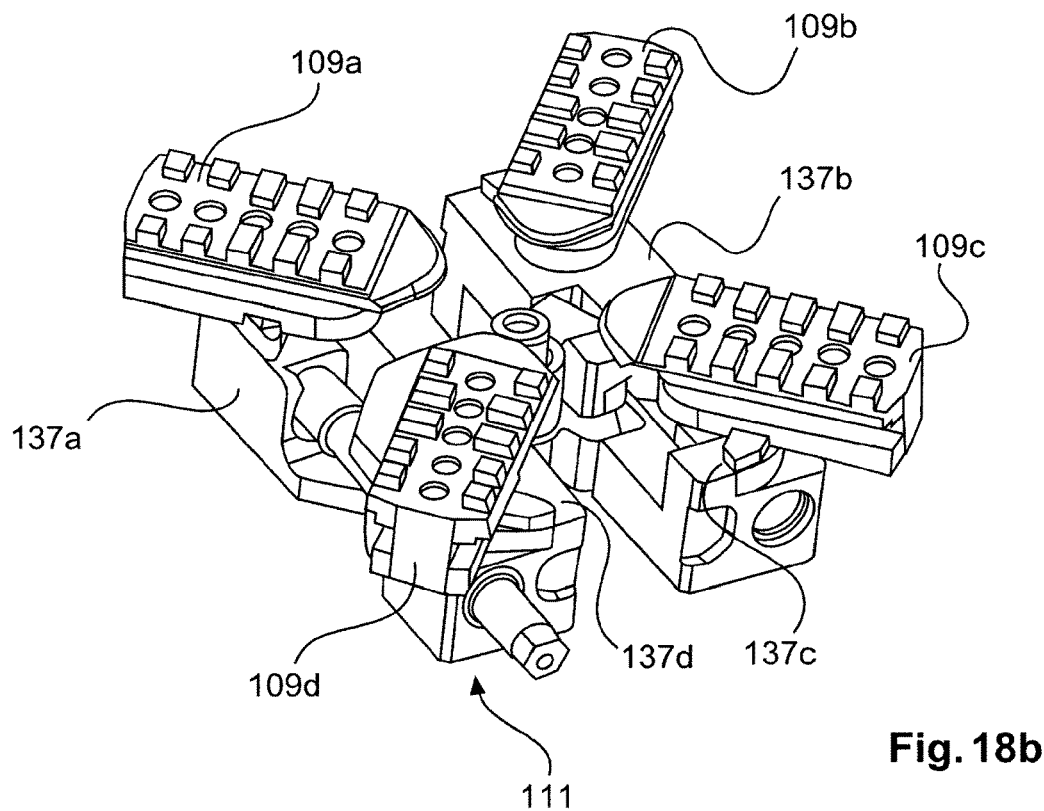
Figure 19A:
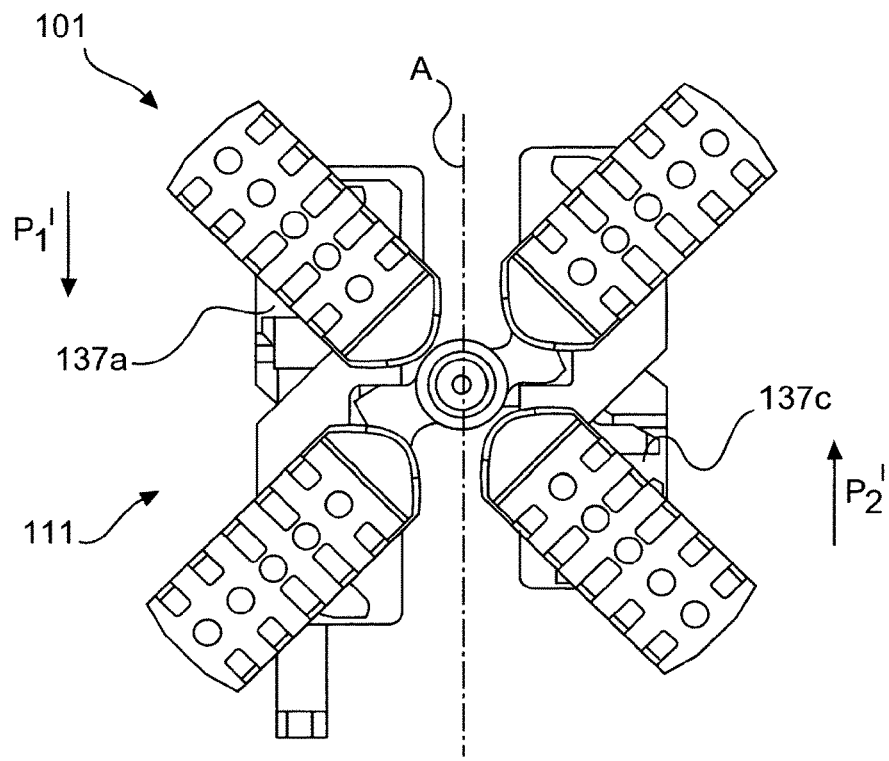
FIGS. 19a, b show various views of the compensating chuck of FIGS. 15 through 18 in a second operating condition.
Figure 19B:
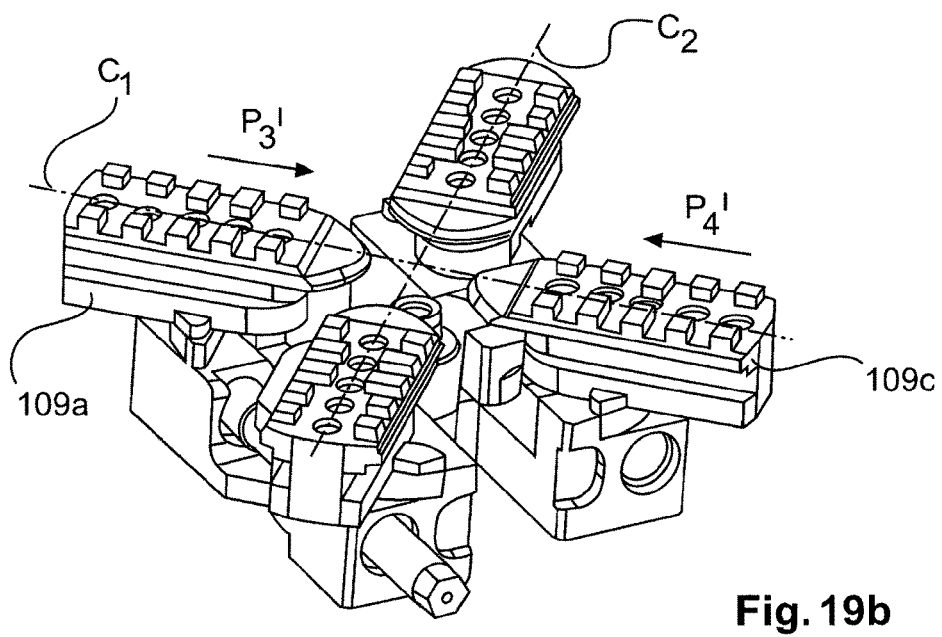

FIGS. 19a, b show a first compensating process. In comparison with the basic position shown in FIGS. 18a, b, the entrainment members 137a, b have been deflected in the direction of the arrows P1', P2'. The other entrainment members are still in the basic position shown in FIG. 18a, b. Because only two of the four entrainment members have been moved, only two of the main jaws have also been moved, see FIG. 19b. The main jaws 109a, c are moved towards each other in the direction of the arrows P3' and P4'. The other entrainment members are caused to stay in the position shown in FIG. 18, for example insofar as one of the entrainment members is fixed in position or the clamping jaws connected to the main jaws already engage the workpiece and thus cannot be further tightened.

Figure 20A:
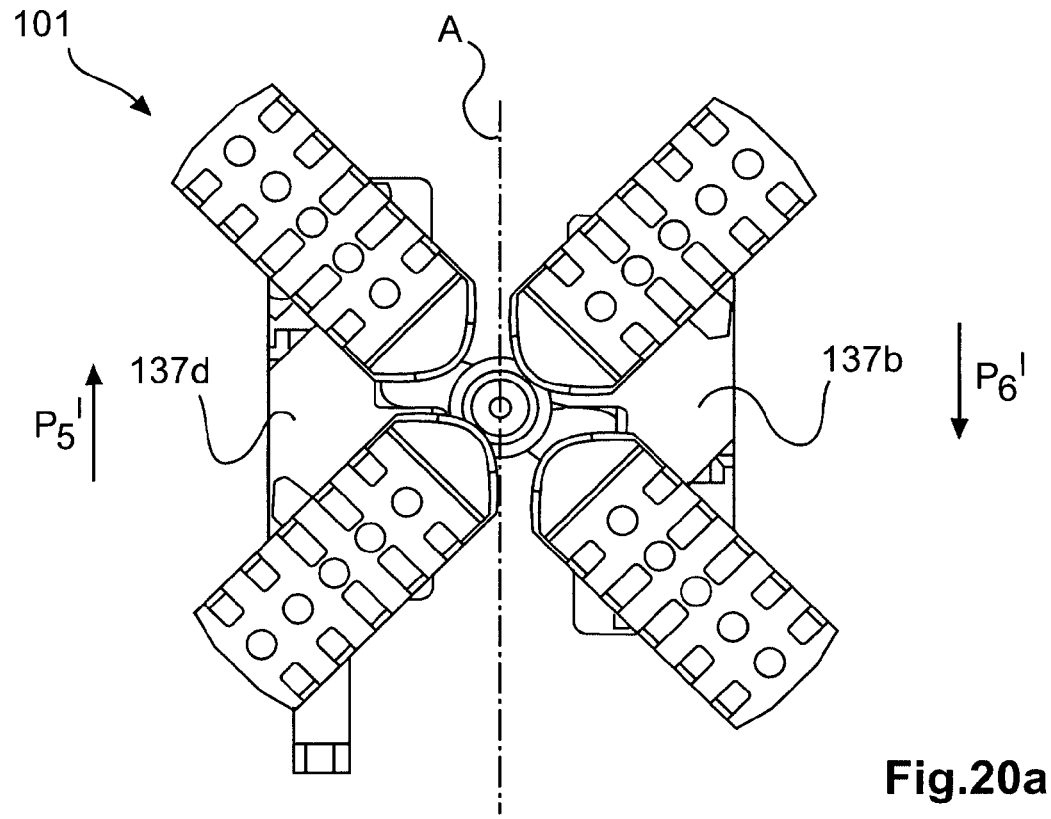
FIGS. 20a, b show various views of the compensating chuck of FIGS. 15 through 19 in a third operating condition.
Figure 20B:
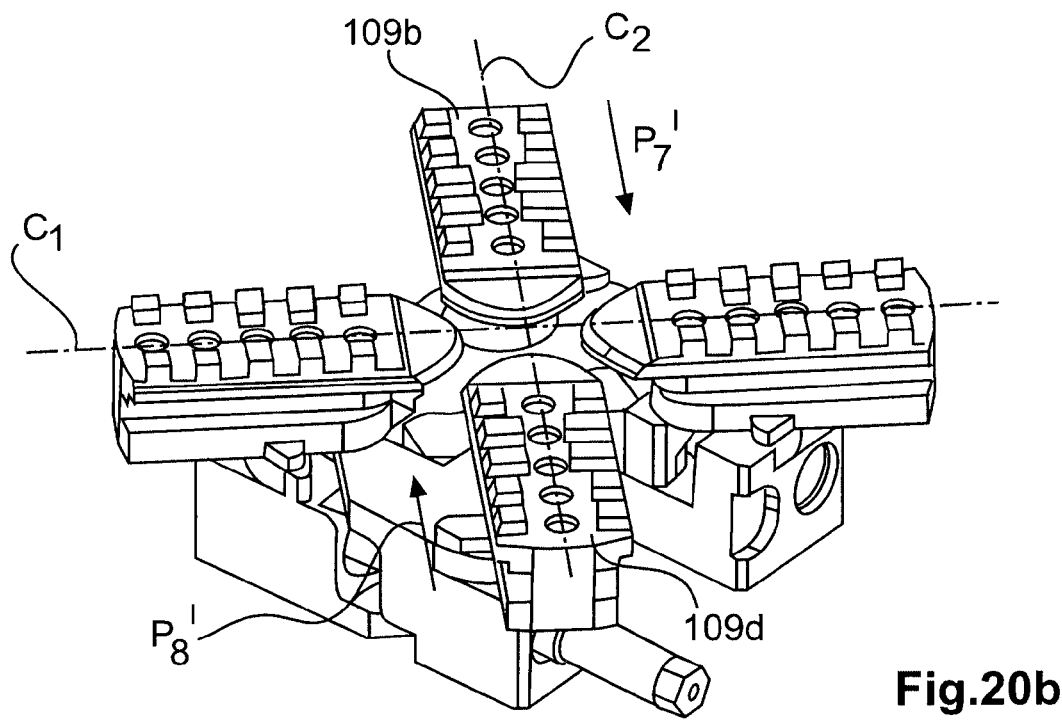

FIGS. 20a, b show the compensation situation which is the converse to FIG. 19a, b. The compensating chuck 101 has been moved relative to the basic position of FIGS. 18a, b so that the entrainment members 137b, d have been moved while the other entrainment members adjacent thereto have respectively remained in the basic position. Consequently, as shown in FIG. 20b, as a result of this only the main jaws 109b, d are also displaced in the direction of the arrows P7' and P8' parallel to the axis C2 while the other main jaws and entrainment members have not been moved.

Figure 21:
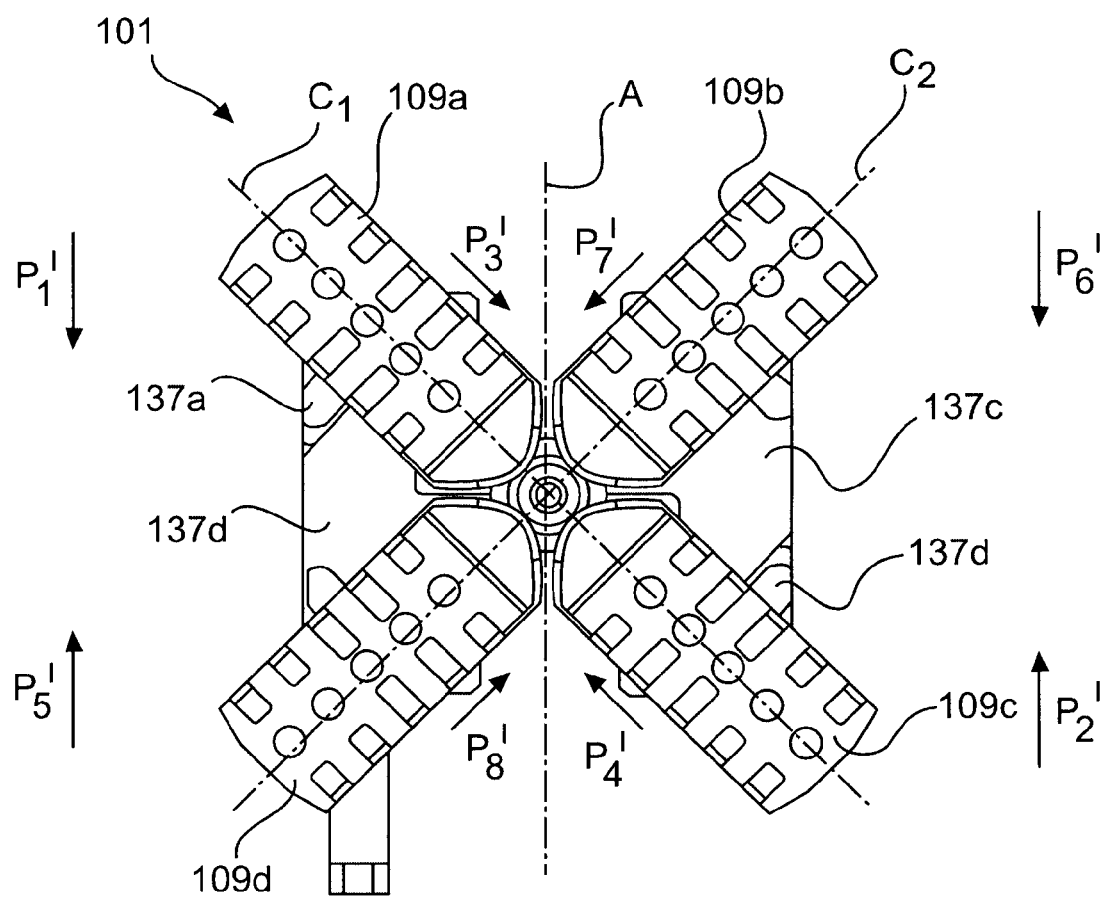
FIG. 21 shows a view of the compensating chuck of FIGS. 15 through 20 in a fourth operating condition.

FIG. 21 shows, in summary, the combined movement of all four entrainment members 137a-d in the direction of the arrows respectively shown in previous FIGS. 19 and 20 from the basic position of FIG. 18 into the completely closed position of FIG. 21. The main jaws 109a-d have been correspondingly displaced in the direction of the arrows in FIGS. 19, 20 from the basic position into the closed position.

FIGS. 22 through 29 show a third embodiment of the compensating chuck according to the invention, which is developed in particular for power-operated clamping. Substantial elements of the structure of the compensating chuck however are similar or identical to the technical details of the compensating chucks in accordance with the first and second aspects of the invention.

Figure 22:
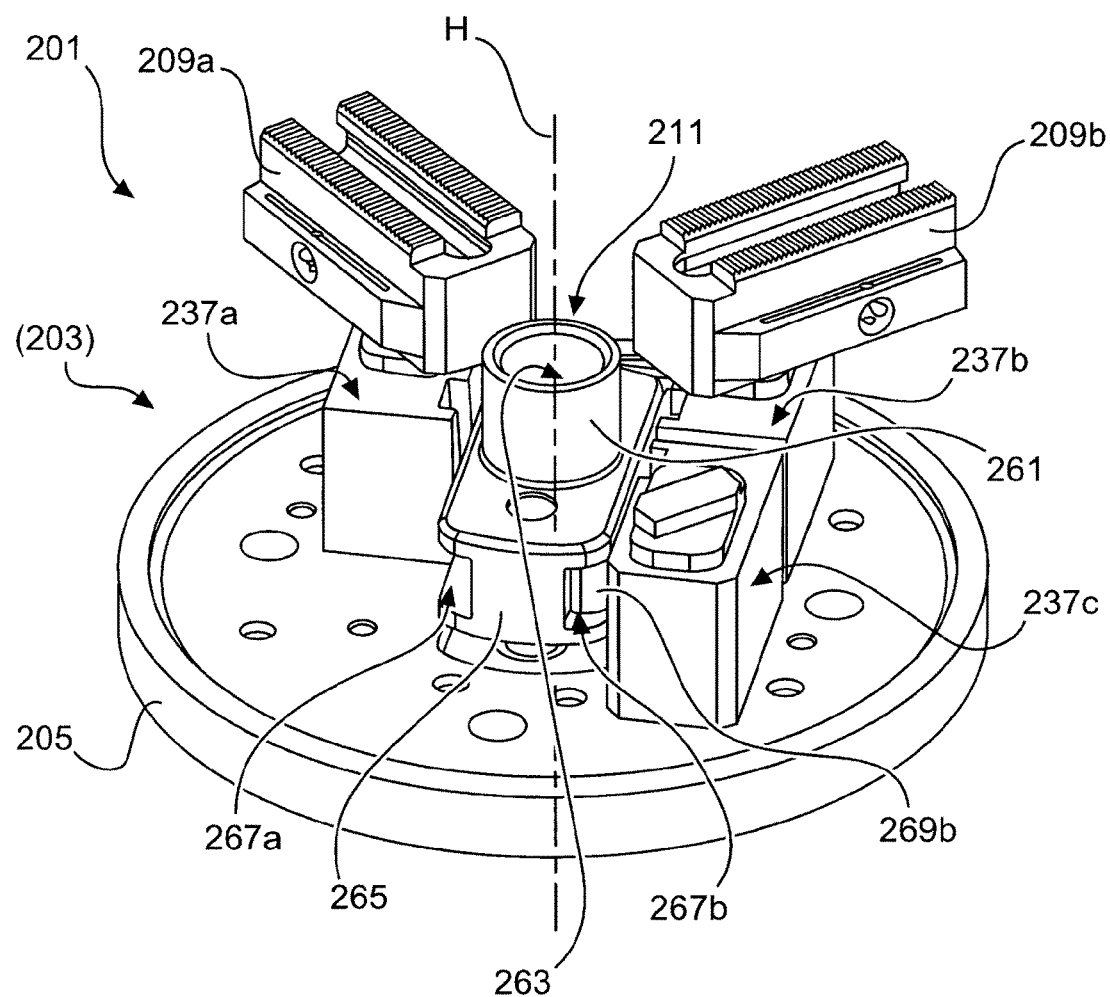
FIG. 22 shows a perspective view of a partly assembled compensating chuck according to a third embodiment according to the present invention, FIGS. 23a, b show a further perspective view of a part of the compensating chuck of FIG. 22.

FIG. 22 shows a perspective view of a partly assembled compensating chuck 201. Some components have been blanked out in order better to show the internal structure of the compensating chuck. The compensating chuck 201 has a housing 203 whose lower housing part 205 is shown here. Four entrainment members 237a-d are arranged in the housing 203 movably, preferably movably in linearly guided relationship. The entrainment members 237a-d are preferably movable perpendicularly to a stroke axis H.

The compensating chuck 201 has a drive unit 211 adapted for power-operated clamping. The drive unit 211 includes a drive piston 261 having a cylindrical or hollow-cylindrical portion, which is upward in FIG. 22 and which is movable guidedly in the housing 203 in the direction of the stroke axis H. The drive unit 211 further has a main body 265 of a shoulder-like configuration, in which there are provided a first transverse groove 267a and a second transverse groove 267b. In the illustrated embodiment, the transverse grooves 267a, b are oriented transversely relative to the direction of a stroke axis H. A respective sliding portion 269a, 269b is accommodated in each of the transverse grooves 267a, b (see FIG. 29). The portion 269a has projections for coming into engagement with corresponding sliding guide-like openings in the entrainment members 237a, d (see FIG. 29). The second sliding portion 269b is of an identical configuration; it has projections which are correspondingly in engagement with sliding guide-like openings 275b, c in the entrainment members 237b, c. A movement of the drive piston 261 in the direction of the stroke axis H is converted into a transverse movement of the entrainment members 237a-d by way of those projections 277a through d in the openings 275a through d.

Figure 29:
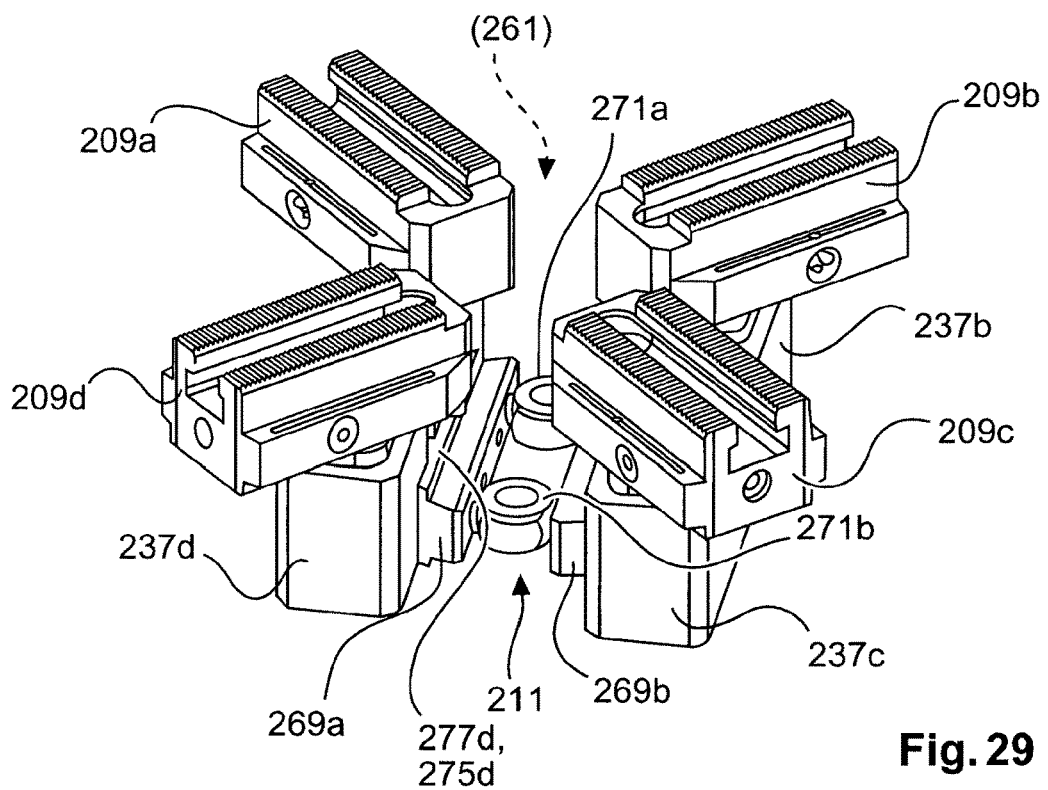
FIG. 29 shows a further perspective view of a part of the compensating chuck of FIGS. 21 through 28 in the fourth operating condition.

The entrainment members 237a-d are in engagement by way of a sliding guide transmission with a respective main jaw 209a-d (see FIG. 29). The transverse movement of the entrainment members 237a-d is converted by way of the sliding guide transmission into a radial movement of the main jaws 209a-d, which are accommodated in the compensating chuck guidedly in a manner known from the foregoing embodiments. The sliding guide transmission functions substantially like the transmission already set forth in the foregoing embodiment.

Figure 23A:
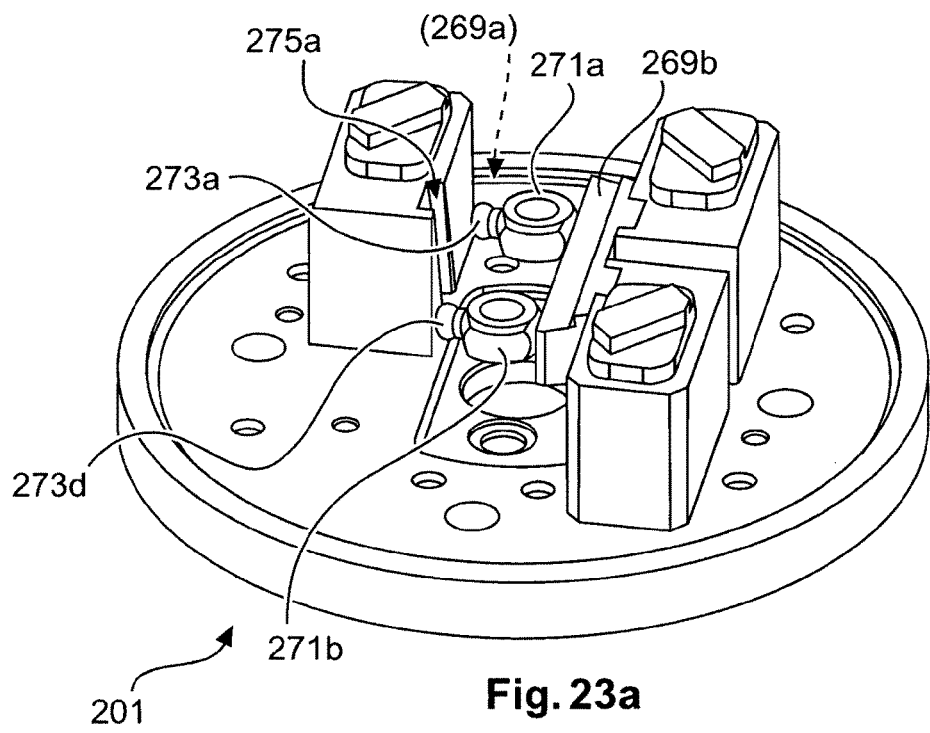
Figure 23B:
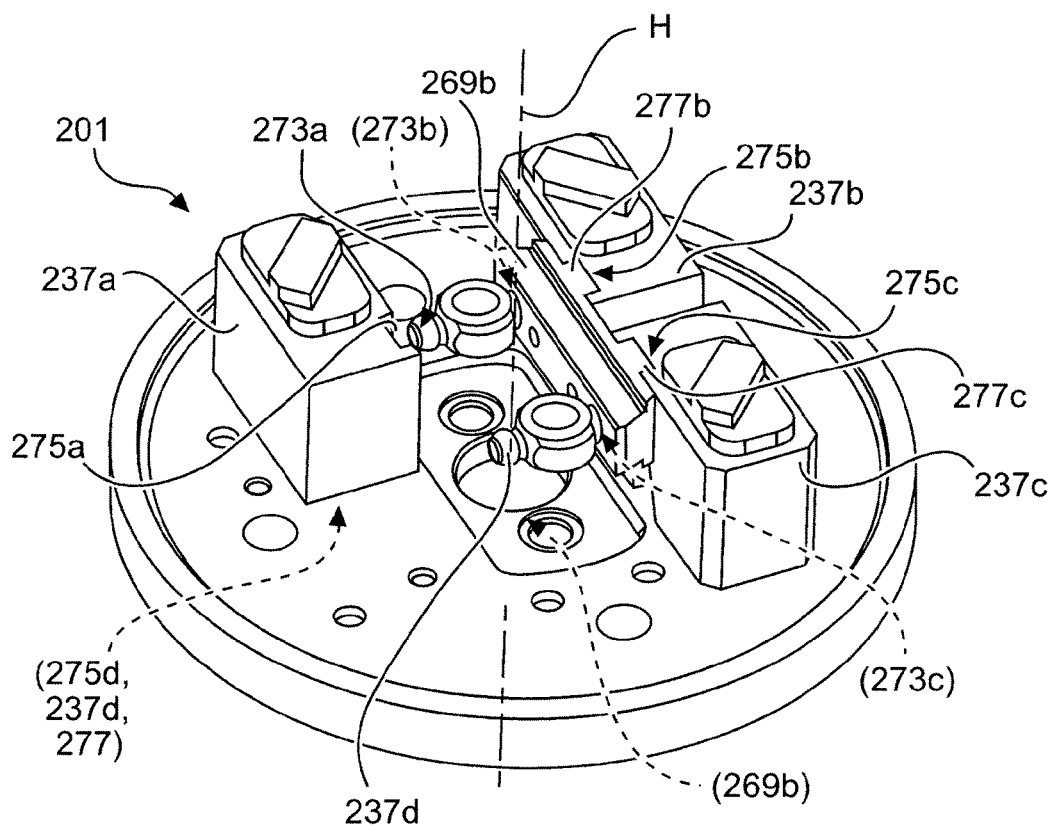
Figure 24A:
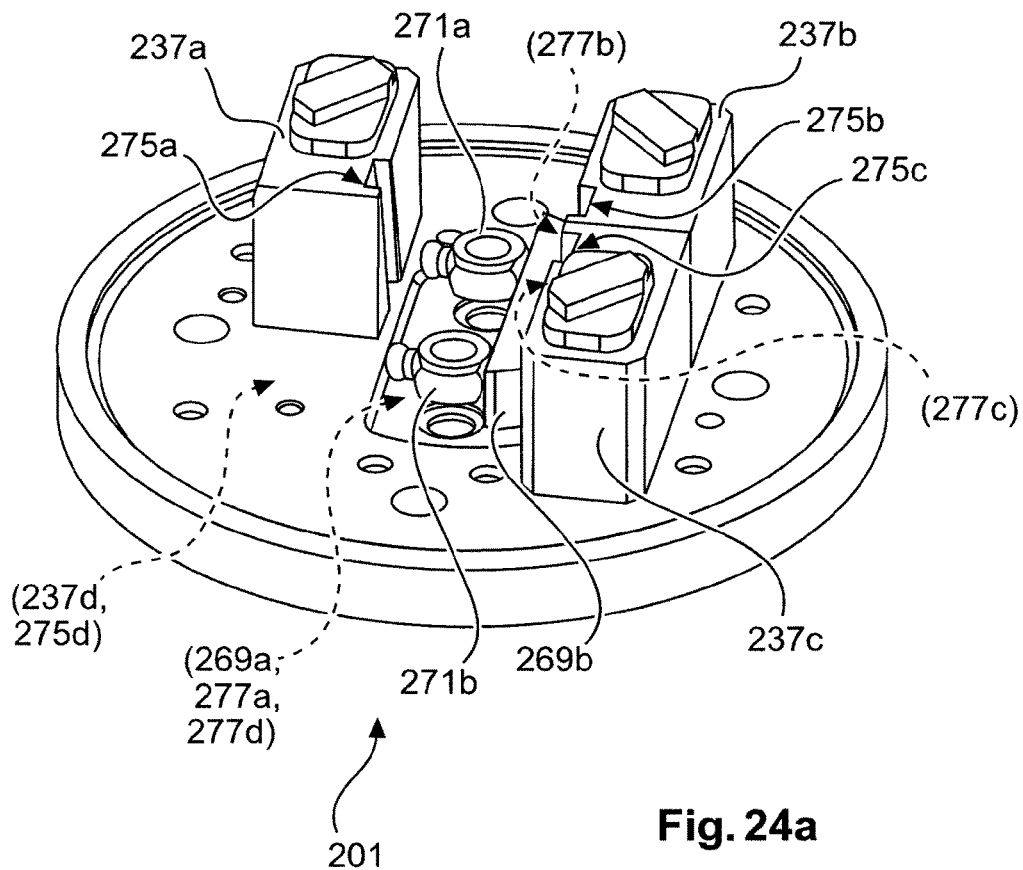
FIGS. 24a, b show a view corresponding to FIGS. 23a, b of the compensating chuck of FIG. 21 in another operating condition.
Figure 24B:
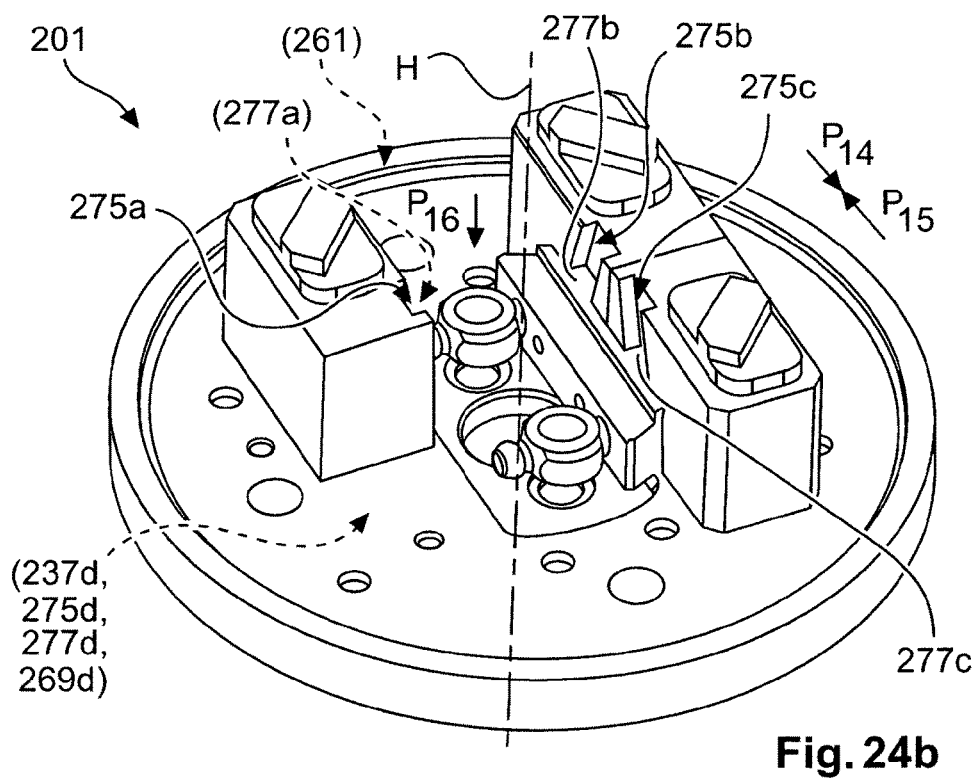

For better clarity of the drawing, not all references from all Figures are in part repeated in the Figures hereinafter. The recurring features are however readily apparent, on consideration of the illustrated views. In addition to the entrainment member 237d, the drive piston 261 (see FIG. 22) is also blanked out in FIG. 23a. The drive unit has a first coupling member 271a and a second coupling member 271b. The coupling members 271a, b are connected to the sliding portions 269a, b by means of two projections 273a, b; 273c, d respectively. The coupling members 271a, b are of such a configuration that a movement of the sliding portion 269a in a first direction causes a synchronous opposite movement of the second sliding portion 269b and vice-versa. In FIGS. 23a, b, the partly blanked-out compensating chuck 201 is shown in a first operating position of maximum opening. The sliding portions are in an upper end position in the direction of the stroke axis H. By virtue of the sliding guide-like openings 275a-d, the entrainment members 237a, d and the entrainment members 237b, c are respectively spaced at maximum distance from each other. When now the drive piston 261 (see FIG. 22) is moved in the direction of the stroke axis H (downwardly in the orientation shown in FIG. 22), that gives a configuration as shown in FIGS. 24a, b. The distance that the drive piston 261 covers starting from FIG. 23a, b to the condition shown in FIGS.

24a, b is indicated by the arrow P16. The entrainment members 237a, d and 237b, c, respectively, have been moved towards each other in the direction of the arrows P14, P15. That is achieved by the sliding guide-like openings 275a-d, which extend inclinedly relative to the stroke axis H.

Figure 25:
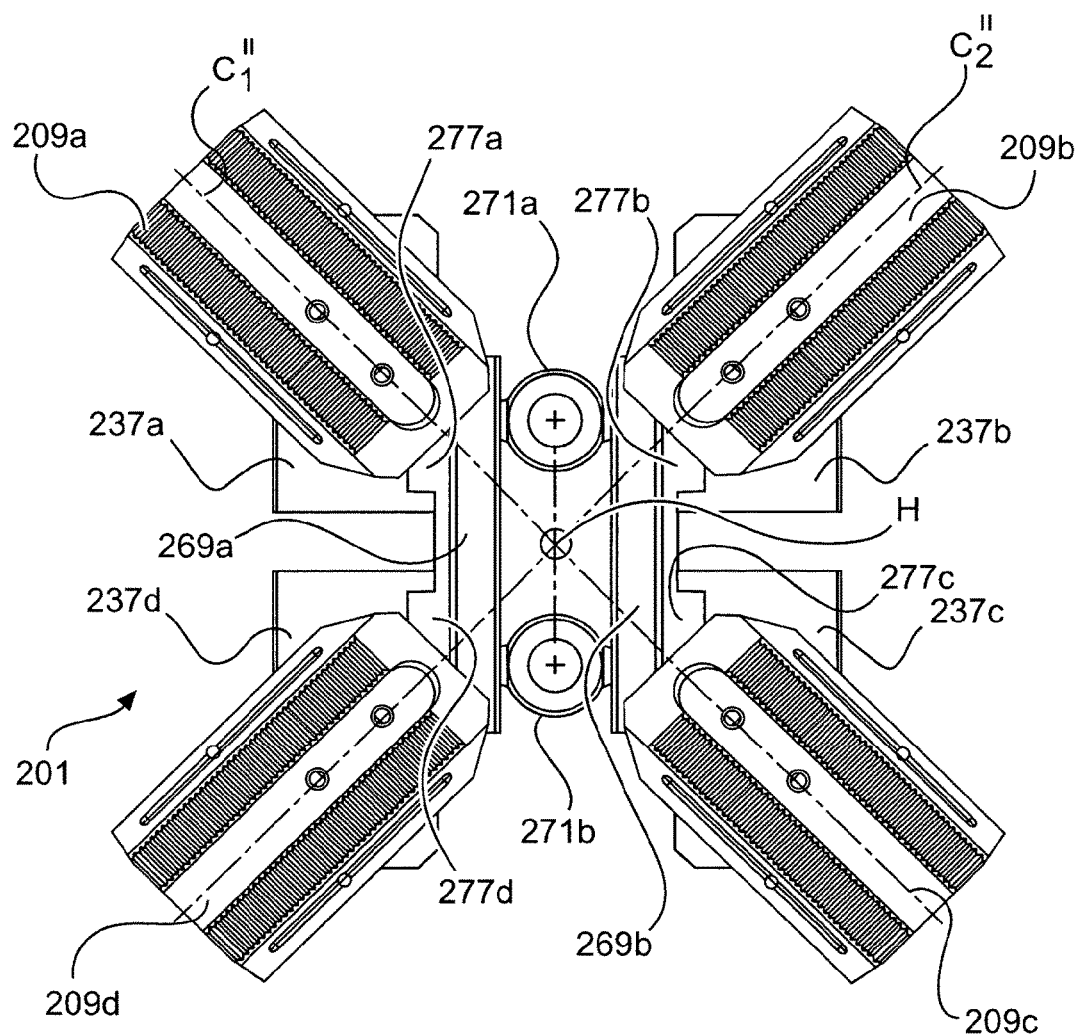
FIG. 25 shows a plan view of a part of the compensating chuck of FIGS. 22 through 24 in a first operating condition.
Figure 26:
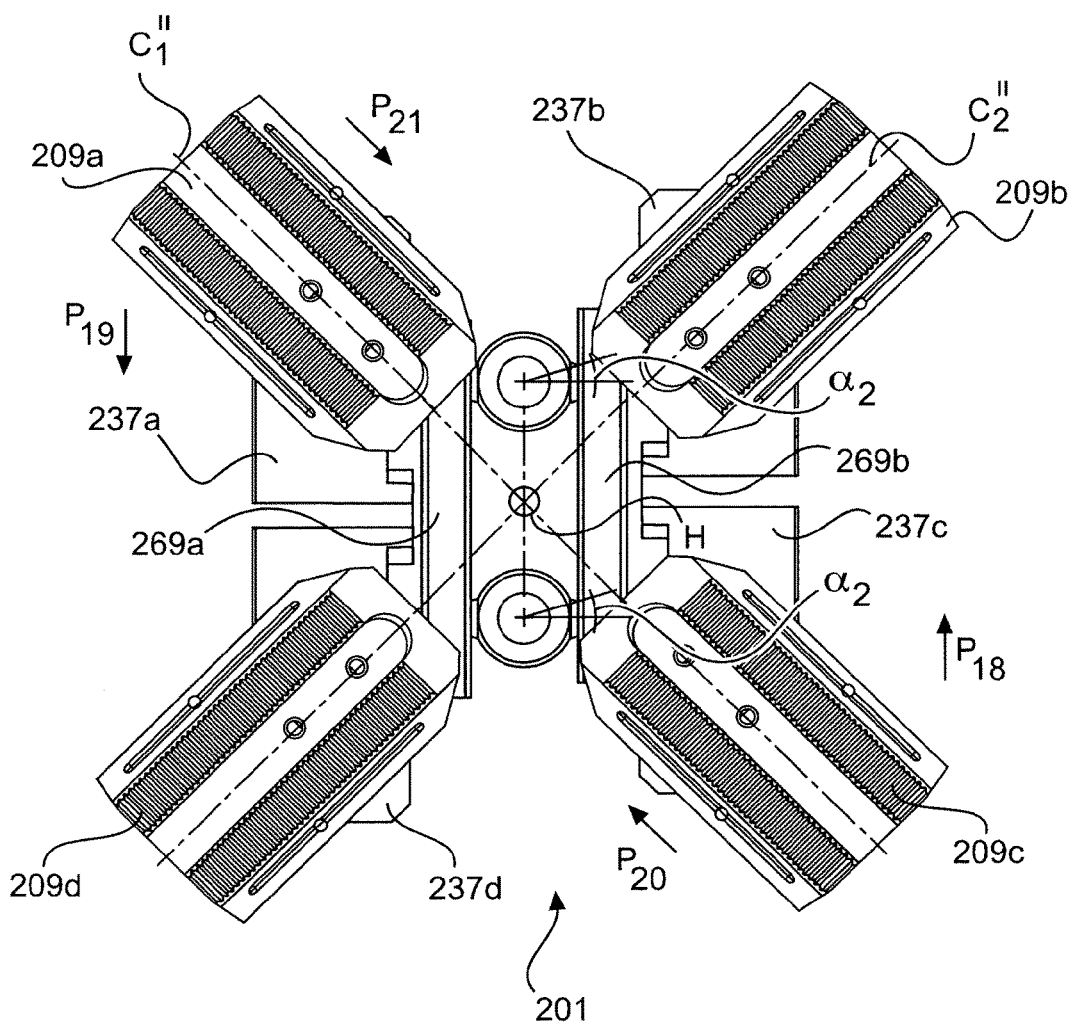
FIG. 26 shows a plan view of the chuck of FIG. 25 in a second operating condition.

The interplay between the movement of the entrainment members 237a-d and the clamping movement coupled thereto of the main jaws 209a-d is shown again in FIGS. 25 through 28. FIG. 25 firstly shows the condition of FIGS. 23a-d. The entrainment members 237a-d have been moved to their maximum spacing from each other by virtue of the position of the sliding portions 269a, b in their end position which is the upper position in the direction of the stroke axis H. By virtue of that first end position, the main jaws 209a-d which are coupled to the entrainment members 237a-d by way of the sliding guide transmission are also in their corresponding first outer end position. The main jaws 209a, c are guided movably in the direction of the radial axis C1", while the main jaws 209b, d are guided radially movably in the direction of the radial axis C2". In comparison with the condition shown in FIG. 25, the two main jaws 209b, d are blocked in the condition in FIG. 26, for example by engaging the workpiece. Drive of the drive piston 261 (see FIG. 22), which is continued from the moment of workpiece engagement, has the result that the sliding portions 269a, b deflect in opposite relationship transversely relative to the direction of the stroke axis H. That is caused by sliding along in the sliding guide-like openings of the entrainment members 237b, d, which are also blocked. As a counterpart thereto, by virtue of that compensating movement which is controlled by a pivotal movement of the projections 271a, b through the angle α2, the entrainment members 237a, c are moved further towards each other in the direction of the arrows P18, P19. Correspondingly, the main jaws 209a, c are also moved further towards each other in the direction of the arrows P21, P20, in comparison with the blocked main jaws 209b, d, to permit a compensating engagement with the workpiece.

Figure 27:
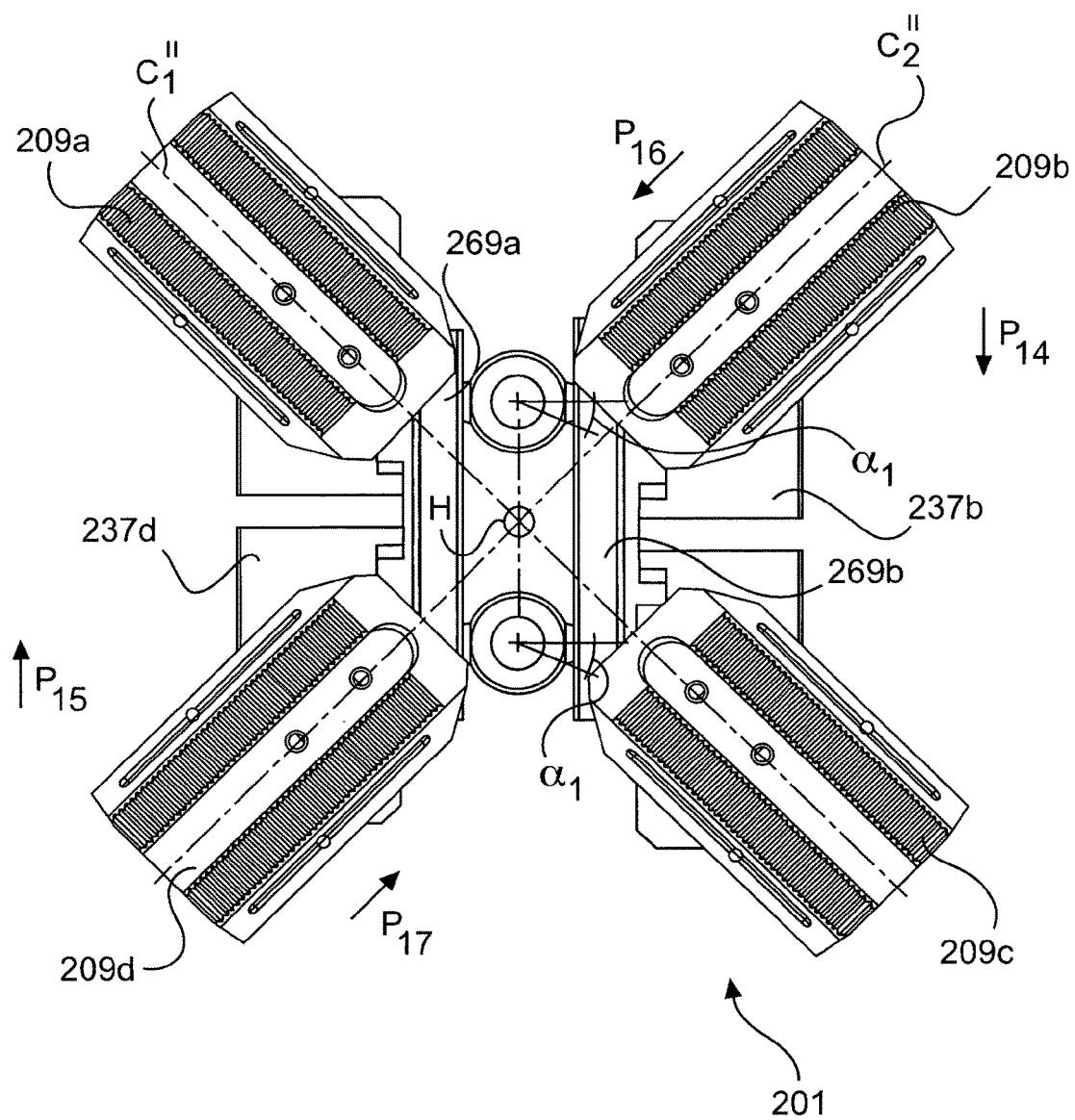
FIG. 27 shows a plan view of the compensating chuck of FIGS. 21 through 26 in a third operating condition.

FIG. 27 shows the opposite compensation situation. In a similar fashion to the condition in FIG. 26, by virtue of blocking of two of the entrainment members, a compensating movement of the sliding portions 269a, b has taken place. By virtue of pivotal movement of the projections 271a, b through the angle α1 and the above-mentioned compensating movement of the sliding portions 269a, b, the non-blocked entrainment members 237b, c are moved towards each other in the direction of the arrows P14, P15, which resulted in an approach movement of the main jaws 209b, d in the direction of the arrows P16, P17 relative to the blocked main jaws 209a, c.

Figure 28:
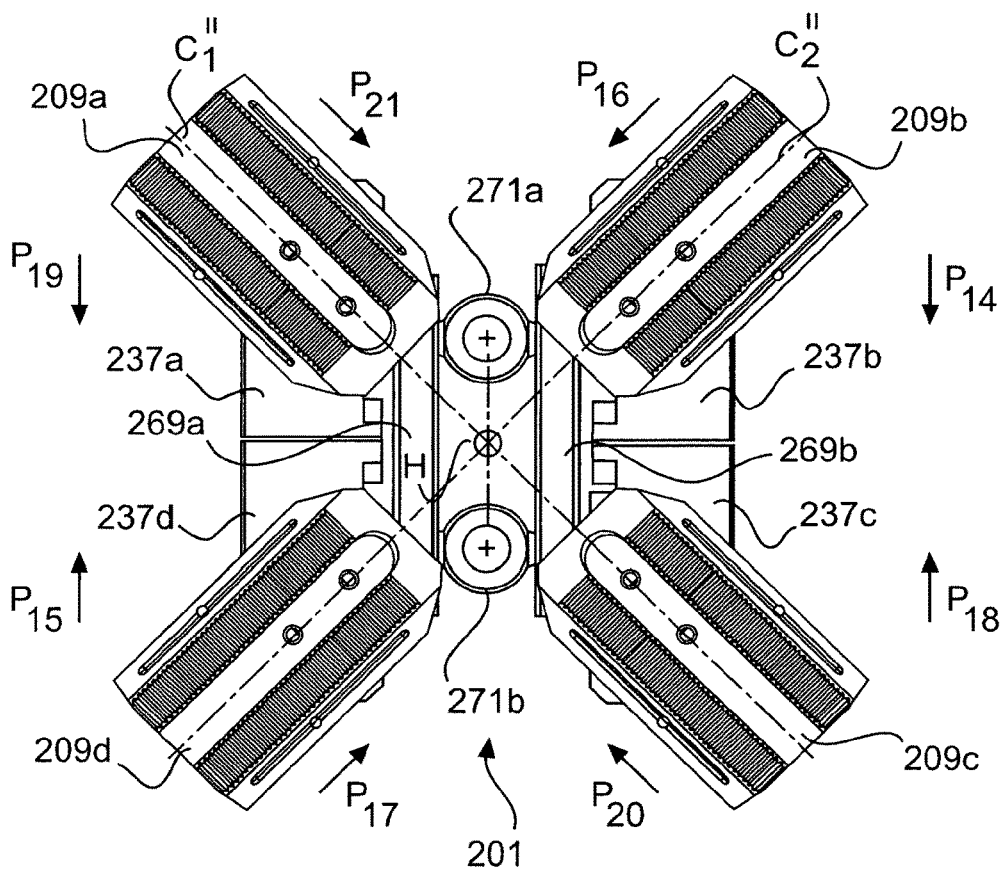
FIG. 28 shows a plan view of the compensating chuck of FIGS. 21 through 27 in a fourth operating condition.

Finally, FIG. 28 shows the operating condition of the compensating chuck, in which the compensating chuck 201 is completely closed.

The projections 271a, b are in their neutral position, as also in FIG. 25. Accordingly, the sliding portions 269a, b are also in a neutral position. The entrainment members 237a, d have moved towards each other to the maximum extent, like also the entrainment members 237b, c. As a consequence thereof, the main jaws 209a, c and 209b, d have also moved towards each other to the maximum extent.

The invention claimed is:

1. A compensating chuck for concentrically clamping workpieces, comprising:
   a housing;
   two pairs of mutually diametrically opposed main jaws for receiving corresponding clamping jaws; and
   a transmission for radially moving the main jaws towards and away from each other,
   wherein the transmission has a drive unit having two pairs of adjacent drivable entrainment members, wherein the entrainment members:
      are mounted slidingly in the housing such that the entrainment members move only in a sliding manner relative to the housing, the movement only in a sliding manner being defined by movement along only a single direction for each entrainment member,
      within each pair are respectively slidable towards and away from each other, and
      are so coupled to a respective one of the main jaws such that a relative sliding movement of the entrainment members within the respective pair with the same movement components relative to each other causes a synchronous movement of adjacent main jaws; and such that both a relative sliding movement of the entrainment members within each pair relative to each other with respectively different movement components and also a synchronous sliding movement of the adjacent entrainment members in the same direction respectively causes a relative movement of adjacent main jaws relative to each other,
   wherein one of the main jaws or the entrainment members has a sliding guide in which a corresponding projection of the other of the main jaws or one the entrainment members is guided, without play.

2. The compensating chuck of claim 1 wherein those entrainment members which are respectively associated with diametrically opposite main jaws are respectively rigid relative to each other.

3. The compensating chuck of claim 2 wherein a first pair of mutually rigid first entrainment members is arranged fixedly on the first slide and a second pair of the first entrainment members is arranged fixedly on the second slide.

4. The compensating chuck of claim 1 wherein the transmission has a sliding guide transmission coupled to the drive unit.

5. The compensating chuck of claim 1 wherein the entrainment members are movable in a first horizontal plane parallel to a first axis (A) and the main jaws are movable in a main jaw plane parallel to the first plane.

6. The compensating chuck of claim 5 wherein the entrainment members are first entrainment members and the compensating chuck has a set of second entrainment members mounted slidingly in the housing.

7. The compensating chuck of claim 6 wherein a respective one of the second entrainment members is in engagement with one of the first entrainment members on the one hand and with one of the main jaws on the other hand in such a way that the movement of the first entrainment members is converted into the movement of the main jaws by movement of the second entrainment members.

8. The compensating chuck of claim 6 wherein the second entrainment members are movable in a second horizontal plane parallel to a second axis (B).

9. The compensating chuck of claim 6 wherein the main jaws respectively have the sliding guide in which the corresponding projection of one of the second entrainment members is guided without play.

10. The compensating chuck of claim 6 wherein the second entrainment members respectively have the sliding guide in which the corresponding projection of one of the first entrainment members is guided without play.

11. The compensating chuck of claim 6 wherein the first entrainment members are guided for sliding movement relative to the housing by guide means provided on the first entrainment members.

12. The compensating chuck of claim 1 wherein the drive unit has a drive spindle and two slides in engagement with the drive spindle.

13. The compensating chuck of claim 12 wherein the drive spindle and the direction of movement of the first entrainment members are oriented parallel to each other.

14. The compensating chuck of claim 1 wherein those entrainment members which are respectively associated with diametrically opposite main jaws are respectively movable in opposite directions synchronously relative to each other.

15. The compensating chuck of claim 14 wherein the mutually diametrically opposite entrainment members are respectively coupled together by a coupling member which is pivotable about a vertical axis.

16. The compensating chuck of claim 14 wherein a respective one of the entrainment members is in engagement with one of the main jaws in such a way that the movement of the entrainment members is directly converted into the movement of the main jaws.

17. The compensating chuck of claim 14 wherein the drive unit for each entrainment member has a separate slide and each of the entrainment members is arranged fixedly on the respective slide.

18. The compensating chuck of claim 17 wherein the drive spindle is in engagement with two of the four slides and the other two slides are drivable by the paired coupling of the entrainment members.

19. The compensating chuck of claim 1 wherein the drive unit has a chuck piston adapted for connection to a power clamping unit of a machine tool.

20. The compensating chuck of claim 19 wherein the chuck piston is guided in the direction of a stroke axis (H), and wherein the drive unit has a first and a second sliding portion which are respectively guided in corresponding openings of the chuck piston at a perpendicular angle to the stroke axis (H).

21. The compensating chuck of claim 20 wherein the sliding portions are so coupled to the entrainment members that a movement of the chuck piston in the direction of the stroke axis (H) leads to a movement of two diametrically opposite entrainment members or all entrainment members.

22. The compensating chuck of claim 20 wherein the sliding portions respectively have projections which are coupled in sliding guide relationship with the entrainment members in such a way that a movement of the respective sliding portion in the direction of the stroke axis (H) causes a relative movement of the entrainment members coupled to the sliding portion perpendicularly to the stroke axis (H).

23. The compensating chuck of claim 20 wherein the sliding portions are arranged in mutually diametrically opposite relationship with respect to the stroke axis (H), are connected by one or more coupling members and are synchronous relative to each other in opposite directions.

24. A compensating chuck for concentrically clamping workpieces, comprising:
a housing;
two pairs of mutually diametrically opposed main jaws for receiving corresponding clamping jaws; and
a transmission for radially moving the main jaws towards and away from each other,
wherein the transmission has a drive unit having two pairs of adjacent drivable entrainment members, wherein the entrainment members:
are mounted slidingly in the housing such that the entrainment members move only in a sliding manner relative to the housing, the movement only in a sliding manner being defined by movement along only a single direction for each entrainment member,
within each pair are respectively slidable towards and away from each other, and
are so coupled to a respective one of the main jaws such that a relative sliding movement of the entrainment members within the respective pair with the same movement components relative to each other causes a synchronous movement of adjacent main jaws; and such that both a relative sliding movement of the entrainment members within each pair relative to each other with respectively different movement components and also a synchronous sliding movement of the adjacent entrainment members in the same direction respectively causes a relative movement of adjacent main jaws relative to each other,
wherein those entrainment members which are respectively associated with diametrically opposite main jaws are respectively movable in opposite directions synchronously relative to each other,
wherein the main jaws respectively have a sliding guide in which a corresponding projection of one of the entrainment members is guided, without play.

25. A compensating chuck for concentrically clamping workpieces, comprising:
a housing;
two pairs of mutually diametrically opposed main jaws for receiving corresponding clamping jaws; and
a transmission for radially moving the main jaws towards and away from each other,
wherein the transmission has a drive unit having two pairs of drivable first entrainment members, wherein the first entrainment members:
are mounted slidingly in the housing,
are respectively movable towards and away from each other in paired relationship, and
are so coupled to a respective one of the main jaws such that a relative movement of the first entrainment members, of a respective pair with the same movement components relative to each other causes a synchronous movement of adjacent main jaws; and such that both a relative movement of the first entrainment members relative to each other with respectively different movement components and also a synchronous movement of the adjacent first entrainment members in the same direction respectively causes a relative movement of adjacent main jaws relative to each other,
wherein the first entrainment members are movable in a first horizontal plane parallel to a first axis (A) and the main jaws are movable in a main jaw plane parallel to the first plane,
wherein the compensating chuck has a set of second entrainment members mounted slidingly in the housing, and
wherein the first entrainment members are mounted slidingly, in the housing, by guide means provided on the first entrainment members.

* * * * *

UNITED STATES PATENT AND TRADEMARK OFFICE
CERTIFICATE OF CORRECTION

Page 1 of 2

PATENT NO. : 10,252,348 B2
APPLICATION NO. : 14/360111
DATED : April 9, 2019
INVENTOR(S) : Jens Meyer It is certified that error appears in the above-identified patent and that said Letters Patent is hereby corrected as shown below:

In the Drawings

Drawing Sheet 15 of 32, lower Figure is labeled "Fig. 12b" and should read -- Fig. 12d --.

In the Specification

Column 1, Line 67, reads "direction, which are intended to permit jaws which are not" and should read -- direction, which is intended to permit jaws which are not --.

Column 7, Line 23, reads "sliding portions has substantially the following effect: upon" and should read -- sliding portions have substantially the following effect: upon --.

Column 12, Line 22, reads "adjacent main jaws 9a, b and 9b, c and 9c, d and 9d, a" and should read -- adjacent pairs of main jaws (e.g., 9a and 9b; 9b and 9c; 9c and 9d; 9d and 9a) --.

Column 12, Line 60, reads "abutment surfaces 23, 25 delimiting the opening 21. 15" and should read -- abutment surfaces 23, 25 delimiting the opening 21. --.

Column 13, Line 25, reads "arrow P11 in the drawer of the axis A into their second end" and should read -- arrow P11 in the direction of the axis A into their second end --.

Column 15, Line 33, reads "members are still in the basic position shown in FIG. 18a, b." and should read -- members are still in the basic position shown in FIGS. 18a, b. --.

Column 15, Line 44, reads "the converse to FIG. 19a, b. The compensating chuck 101" and should read -- the converse to FIGS. 19a, b. The compensating chuck 101 --.

Column 16, Line 67, reads "starting from FIG. 23a, b to the condition shown in FIGS." and should read -- starting from FIGS. 23a, b to the condition shown in FIGS. --.

Signed and Sealed this
Eleventh Day of August, 2020

Andrei Iancu
*Director of the United States Patent and Trademark Office*

CERTIFICATE OF CORRECTION (continued)
U.S. Pat. No. 10,252,348 B2

In the Claims

At Claim 1, Column 18, Line 23, reads "same direction respectively causes a relative move-" and should read -- same direction respectively cause a relative move- --.

At Claim 1, Column 18, Line 27, reads "of the other of the main jaws or one the entrainment" and should read -- of the other of the main jaws or one of the entrainment --.

At Claim 24, Column 20, Line 21, reads "same direction respectively causes a relative move-" and should read -- same direction respectively cause a relative move- --.

At Claim 25, Column 20, Line 53, reads "tively causes a relative movement of adjacent main" and should read -- tively cause a relative movement of adjacent main --.